United States Patent [19]

Pall et al.

[11] 4,340,480
[45] Jul. 20, 1982

[54] PROCESS FOR PREPARING LIQUOPHILIC POLYAMIDE MEMBRANE FILTER MEDIA AND PRODUCT

[75] Inventors: David B. Pall, Roslyn Estates; Frank Model, Dix Hills, both of N.Y.

[73] Assignee: Pall Corporation, Glen Cove, N.Y.

[21] Appl. No.: 198,570

[22] Filed: Oct. 20, 1980

Related U.S. Application Data

[63] Continuation-in-part of Ser. No. 905,698, May 15, 1978, abandoned.

[51] Int. Cl.³ .................................................. B01D 31/00
[52] U.S. Cl. .................................. 210/490; 210/493.5; 210/497.01; 210/500.2; 264/41
[58] Field of Search .................... 210/500.2, 490, 493.5, 210/497.01; 264/41, 162, 184; 521/64, 85, 88, 97, 484; 260/30.4 N; 528/332, 335, 336, 337

[56] References Cited

U.S. PATENT DOCUMENTS

| | | | |
|---|---|---|---|
| 2,783,894 | 3/1957 | Lovell et al. | 521/64 X |
| 3,389,206 | 6/1968 | Jamison | 264/184 |
| 3,457,339 | 7/1969 | Pall et al. | 264/162 |
| 3,524,753 | 8/1970 | Sharp | 521/64 X |
| 3,876,738 | 4/1975 | Marinaccio et al. | 264/44 |
| 3,894,166 | 7/1975 | Brown et al. | 210/500 M X |

*Primary Examiner*—Frank A. Spear, Jr.

[57] ABSTRACT

A process is provided for preparing skinless liquophilic alcohol-insoluble polyamide membranes by preparing at a first temperature a solution in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; spreading the casting solution on a substrate to form a thin film thereof on the substrate; cooling the film of casting solution to a second temperature sufficiently lower than the first temperature to precipitate polyamide resin from the casting solution; contacting and diluting the film of casting solution with a nonsolvent liquid, preferably containing a substantial proportion of the solvent liquid but less than the proportion in the casting solution, to precipitate polyamide resin from the casting solution in the form of a thin skinless liquophilic membrane; and washing and drying the resulting membrane.

79 Claims, 4 Drawing Figures

PROCESS FOR PREPARING LIQUOPHILIC POLYAMIDE MEMBRANE FILTER MEDIA AND PRODUCT

This application is a continuation-in-part of Ser. No. 905,698, filed May 15, 1978, and now abandoned.

Microporous membrane sheets are available which have absolute particle removal capability in the range of about 0.1 micron and larger. These are for the most part made of synthetic resins and cellulose derivatives, and are used as filter media for removing suspended particles and micro-organisms from fluids.

Such membranes are made using the so-called "dry process" by casting a solvent solution of the resin or cellulose derivative on a temporary support or substrate as a thin film, after which the solvent is removed or exchanged under carefully controlled conditions. Solvent removal and exchange are very slow, and while the process is adaptable for continuous operation, a very large supporting belt system is required as the substrate for laydown or casting of the film, and the drying set-up to carry out removal of the solvent. This increases plant size and the capital costs in plant construction, and ensures a high cost of manufacture.

Because of the very length of material (solution or film) which is in process at any one time, adjustment of processing conditions for close control of product characteristics is difficult. While the final product is being removed and tested for its characteristics, a very large volume of material is already in process of being formed into a membrane, and past the point where an adjustment of the process parameters to modify product characteristics, however prompt, could affect it. Thus a considerable amount of out-of-specification membrane sheet is made before the result of a correction can be seen at the end of the production line. This results in a large production of membrane sheet being out-of-specification, and a wide range of product variation necessarily has to be accepted, to keep rejections at a minimum. As a consequence of high production cost and high rejection rate, the price for such membrane sheet tends to be rather high.

Another process for preparation of membrane sheets also starts from a solution of the resin or cellulose derivative, casting a film of the solution on a support, and then forming the membrane by precipitation upon immersion of the film solution in a nonsolvent for the resin. This process results in a skinned membrane, with surface portions having fewer or very much smaller pores, or even zero pores, and an interior portion with larger pores, the outer skinned portions having higher apparent density than the interior portions.

Skinned membranes are nonuniform with respect to particle removal; for example, the membranes now used for reverse osmosis are effective in accomplishing such tasks as 90% or better salt rejection, thus functioning in the 2 to 5 Angstroms (0.002 to 0.005 $\mu M$) range, but are incapable of providing sterility in the effluent, allowing bacteria in the range of 2000 Angstroms (0.2 $\mu M$) to pass. Such membranes are poorly suited when absolute removal of particulate material as bacteria is needed.

Thus, for example, Michaels U.S. Pat. No. 3,615,024, patented Oct. 26, 1971, describes the formation of anisotropic membranes having pores of from 1 to 1000 $\mu M$ from a variety of synthetic resins by:

(1) forming a casting dope of a polymer in an organic solvent,
(2) casting a film of said casting dope,
(3) preferentially contacting one side of said film with a diluent characterized by a high degree of miscibility with said organic solvent and a sufficiently low degree of compatibility with said casting dope to effect rapid precipitation of said polymer, and
(4) maintaining said diluent in contact with said membrane until substantially all said solvent has been replaced with said diluent.

The submicroscopically porous anisotropic membranes consist of an integral macroscopically thick film of porous polymer, usually more than about 0.002 and less than about 0.050 inch in thickness. One surface of this film is an exceedingly thin but relatively dense barrier layer or "skin" of from about 0.1 to 5.0 microns thickness of microporous polymer in which an average pore diameter is in the millimicron range, for example from 1.0 to 1000 millimicrons, i.e., about one-tenth to one-hundredth the thickness of the skin. The balance of the integral film structure is a support layer comprised of a much more coarsely porous polymer structure through which fluid can pass with little hydraulic resistance. By "integral film" is meant continuous, i.e., a continuing polymer phase. When such a membrane is employed as a "molecular filter" with the "skin-side" in contact with fluid under pressure, virtually all resistance to fluid flow through the membrane is encountered in the "skin", and molecules or particles of dimensions larger than the pores in the "skin" are selectively retained. Because the skin layer is of such extraordinary thinness, and because the transition from the skin layer to the macroporous support structure is so abrupt, normally less than about one-half the thickness of the barrier layer or less than one micron, the over-all hydraulic resistance to fluid flow through the membrane is very low; that is, the membrane displays surprisingly high permeability to fluids in proportion to its pore size.

Michaels suggests that the formation of these anisotropic membranes appears to be related to certain diffusional and osmotic solvent-exchange processes as described hereinbelow:

When a thin layer of polymer solution deposited on a suitable substrate (to assure preferential contact of diluent with one surface) is contacted with diluent on one surface, diluent and solvent interdiffuse in the outermost layer almost instantaneously. Thus gelation or precipitation of the polymer takes place almost instantaneously. In view of the rapidity of this process, the topmost layer of the cast film solidifies as an exceedingly thin membrane skin whose porosity and pore-fineness are governed by the compatibility criteria developed above. As soon as this membrane skin is formed, however, the rate of penetration of diluent into the underlying region of the cast film, and rate of extraction of the solvent component, are greatly retarded. (It must not, however, be stopped entirely.) Under these circumstances, subsequent alteration in solution composition within the film occurs quite slowly. As a result there is opportunity, when a suitable solvent is present, for slow phase-separation to occur to form a grossly microporous substructure consisting of large interconnected voids occupied by solvent/diluent solution, and an interstitial polymer matrix comprising consolidated, nearly solvent-free polymer. Hence, the formation of a highly permeable, coarsely microporous substructure is in large part due to proper selection of a solvent system for film-casting dopes and the selection of a proper diluent for coaction with the solvent system during the precipitation step.

Thus, the Michaels membranes are all skinned, and moreover, while the membranes as water-wettable as long as they are kept wet, once dried they are all hydrophobic, and difficult to wet with water, except with the aid of surface-active agents or other wetting aids.

Salemme U.S. Pat. No. 4,032,309, patented June 28, 1977, prepares polycarbonate resin membranes described as hydrophobic, evidently of very small pore size, in the ultrafiltration range. Salemme refers to Michaels U.S. Pat. No. 3,615,024 and Kimura U.S. Pat. No. 3,709,774, and states that both Michaels and Kimura utilize the general procedure of preparing a casting solution of the polymer, casting a film thereof on a smooth substrate and immersing the substrate and film in an appropriate quenching bath for the development of asymmetric structural characteristics of the completed film.

These methods differ from each other in the manner in which some of the process steps are conducted. While the Michaels patent is particularly directed to the preparation of a membrane having a microporous support layer and an integral microporous skin, Kimura is primarily interested in a film structure presenting a porous region adjacent a very thin dense nonporous layer. Kimura specifically teaches the preparation of a casting solution consisting of the polymer and two mutually miscible solvents in which the polymer is soluble to substantially different degrees. Both the Michaels and Kimura methods view the immersion (or membrane-forming) bath as one which functions as a solvent for the casting solution solvent system, functioning thereby solely to remove casting solution solvent from the film structure.

Contrary to the Kimura process, Salemme does not employ a three-component (resin, good solvent, poor solvent) casting solution and, in contrast to both Kimura and Michaels, Salemme utilizes an immersion (quenching) bath to initiate formation of the film that must provide a function neither disclosed nor contemplated in either Kimura or Michaels; namely, causing swelling of the polycarbonate resin material at the same time as the casting solvent is removed from the film thereby.

The Salemme method for the preparation of porous polycarbonate and other resin membranes comprises the steps of:

(a) preparing a casting solution at room temperature consisting of polycarbonate resin material and a casting solvent composed of one or more good solvents, the casting solution being stable at room temperature;

(b) casting a layer of the casting solution so formed on a smooth, clean surface or support;

(c) permitting desolvation to occur for a predetermined time interval from said layer;

(d) immersing said layer and support in a quenching bath liquid, the quenching bath liquid being capable of dissolving the casting solvent and causing swelling of the polycarbonate resin content of the layer while being a non-solvent for the polycarbonate resin, the immersion step initiating formation of a microporous membrane by entry of the quenching bath liquid into said layer and exit of casting solvent therefrom;

(e) removing the microporous membrane from the quenching bath; and (f) removing the remaining casting solvent and quenching bath liquid from the microporous membrane.

The microporous films produced by the Examples are said to be at least as effective for filtration as those produced in accordance with the prior art method of casting and desolvating in controlled atmosphere for extended periods. Generally, the films are said to exhibit better flow rates and to be more readily wettable than the prior art films.

The response of these microporous films is measured in terms of the foam-all-over point, which is the pressure required to cause foam to develop over the surface of the film. This method is commonly employed in this art, and is referred to as the Bubble Point. Moreover, the process for manufacture of these membranes is not susceptible of adaptation for continuous production.

A number of alcohol-insoluble (i.e., insoluble in ethanol) polyamide resin membrane sheets have been described, but to our knowledge none has been marketed. Where sufficient information has been provided to permit duplication of the production of these membranes, they have all been heavily skinned. Membranes of alcohol-soluble (i.e. soluble in ethanol) polyamides have been made which are skinless, but they have to be used with media which do not contain ethanol or a number of other solvents in which they are soluble. Further, such membranes are not capable of use after steam sterilization, a highly desirable attribute for media used in large part for producing bacterially sterile filtrates. Hollow fiber membranes made of polyamide resin are marketed in commercially available equipment, but these are heavily skinned, and serve to accomplish partial separations in the reverse osmosis range.

Lovell et al U.S. Pat. No. 2,783,894, patented Mar. 5, 1957, and Paine U.S. Pat. No. 3,408,315, patented Oct. 29, 1968, provide a process for producing alcohol-soluble polyamide membrane sheets using Nylon 4, poly-$\epsilon$-butyrolactam. The term "alcohol-soluble" is used by these patentees to refer to polyamide resins soluble in lower aliphatic alcohols such as methanol or ethanol, and is so used in the present specification and claims. A solution of nylon can be cast as a liquid film and then converted to a solid film which presents a microporous structure when dried. An alcohol-water solution containing nylon is prepared and adjusted to the point of incipient precipitation. The solution is brought to the point of incipient precipitation by adding to the solution a solvent-miscible nonsolvent which decreases the solubility of the nylon. This point is indicated when a small amount of nonsolvent added to a sample of the solution causes an obvious precipitation of nylon.

The nylon solution, adjusted to the point of incipient precipitation and containing the proper additives, is cast as a liquid film on an optically smooth surface of a solid base and then converted to a solid film by exposure to an atmosphere containing a constantly maintained concentration of exchangeable nonsolvent vapors, that is, vapors of a liquid in which nylon is not soluble but which are exchangeable with vapors of the solvent for the nylon. The resulting membranes are, of course, soluble in alcohol, as well as in a considerable number of other solvents, and may not be steam sterilized, which limits the scope of their usefulness.

Hiratsuka and Horiguchi U.S. Pat. No. 3,746,668, patented July 17, 1973, also prepares membranes from alcohol solutions of polyamides which are alcohol-soluble, gelling the solution by addition of a cyclic ether as a gelling agent, and drying the film. Alcohol-soluble relatively low molecular weight copolymers of Nylon 6 and Nylon 66 and of Nylon 6, Nylon 66 and Nylon 610 are used.

Marinaccio and Knight, U.S. Pat. No. 3,876,738, patented Apr. 8, 1975, describes a process for producing microporous membrane sheets from alcohol-soluble and alcohol-insoluble polyamides such as Nylon 6, poly-$\epsilon$-caprolactam, and Nylon 610, polyhexamethylene sebacamide, by casting a solution of the polymer on a substrate and then precipitating the membrane, both steps being carried out sequentially or concurrently in a quenching bath of nonsolvent liquid.

The nylon solution after formation is diluted with a nonsolvent for nylon, and the nonsolvent employed is miscible with the nylon solution. Marinaccio et al discuss polymer molecule aggregation in solution, and assert that "the tightest or most nonporous polymer film is produced from a solution in which there is no aggregate formation."

According to Marinaccio et al, "... the resulting film strength is primarily determined by the polymer concentration because of the larger number of chain entanglements occurring higher polymer levels. In addition, for film cast from the ideal solution the "pore size" would increase slightly with polymer concentration because of the increasing aggregation tendency at higher concentrations. Aggregation in solution results in film porosity since the film as cast can be thought to consist of interacting aggregated spherical particles. The larger the spheres, the larger the voids in the film. Structurally this is much like a box of tennis balls or other nonspherical geometrics fused at their point of contact."

As a first step, then, Marinaccio et al control film porosity by "control of the aggregation tendency in the casting solution. This is accomplished ... by the addition of nonsolvent or other additives to change the solvent power of the solution, hence influencing and controlling the aggregation tendency of the polymer molecules. The interaction of these aggregates in determining the resulting film structure is further influenced by the various process variables previously maintained."

This is Marinaccio et al's theory, but it is not adequate to explain what actually occurs, and is in many respects not consistent without actual observations. Moreover, it differs from other more generally accepted theories advanced to explain polymer membrane formation, as for instance, *Synthetic Polymeric Membranes,* Kesting (McGraw Hill 1971) pp 117 to 157. Kesting's theory is more credible for a number of reasons; for example, it accounts for the very high voids volume of the membranes, which Marinaccio's "tennis ball" theory fails to do; further it explains why only relatively polar polymers are susceptible to membrane formation, which again Marinaccio does not.

Marinaccio et al then assert: "The selection of a solvent for a selected film-forming polymer can be made on the basis of the foregoing information. Determination of optimum solvent systems as well as other process variables can then be made on the basis routine laboratory experimentation." However, dilution of the solution by addition of a nonsolvent has a limit: "dilution with nonsolvent can be effected up to the point of incipient precipitation of the nylon, but not beyond." The casting solutions are stable enough to be subjected to ageing periods of as much as five to eight days, and indefinitely in some cases, but not so long that the dissolved nylon separates.

The quenching bath may or may not be comprised of the same nonsolvent selected for preparation of the nylon solution, and may also contain "small amounts" of the solvent employed in the nylon solution. However, the ratio of solvent to nonsolvent is lower in the quenching bath than in the polymer solution, in order that the desired result be obtained. The quenching bath may also include other nonsolvents, e.g., water. In all of the Examples, the solvent utilized for the solutions is formic acid, but none of the quench baths contained even a small amount of formic acid.

The Marinaccio et al process is said to differ from conventional methods of preparing microporous films in using more simplified casting solutions, but more importantly in eliminating the slow equilibration step of gelling in a high humidity atmosphere. In conventional processes this is a critical step in the formation of the desired film structure. In the Marinaccio et al process the film is cast directly in the quench bath, and immediately quenched. By controlling the casting solution formation as discussed above and controlling the quench bath variables including composition and temperature, film structure is said to be controlled. This technique forms the film structure "catastrophically" and is in direct contrast to the slow equilibrium technique needed in conventional processes.

In some cases Marinaccio et al suggest it may be desirable to pass the cast film through a short air evaporation zone prior to the quench bath. The technique could be used in those cases in which a graded cross-sectional structure is desired in the film.

The product of Marinaccio et al has not been commercialized, and is unavailable. The formation of a polymer film by direct immersion of the casting resin into a quench bath is difficult, and it has not been economically feasible to attempt to duplicate the Marinaccio et al process so that the characteristics of the product could be studied, since such a study would require constructing a rather elaborate apparatus. It is also noteworthy that none of Marinaccio et al's Examples include formation of the film in a quench bath, but instead are manually cast in individual laboratory tests onto glass plates.

Tests were run using the glass plate method described by Marinaccio et al, with delay periods between drawing the film and immersion in the bath varied from less than three seconds to as long as one minute; there was no significant difference in product characteristics. It may therefore be assumed that the film resulting from casting under the bath surface (representing extrapolation to zero time) will not be different. With this in mind, the casting resins of his Examples were formed as thin films, and with minimum delay, always under one minute, so as to allow no significant loss of solvent by evaporation, immersed into the baths described; in all cases the films obtained were heavily skinned.

A number of polyamide resin membranes have been used for reverse osmosis and ultrafiltration, but all have pore sizes below 0.1 $\mu$, and therefore provide flow rates below the range useful in particulate and bacteria filtration. Although the pores are small enough to remove microorganisms, such as bacteria, such membranes are not used for this purpose, but instead accomplish such tasks as reverse osmosis and ultrafiltration, which are not quantitative, and which can tolerate the imperfections which characterize skinned nylon membranes.

Steigelmann and Hughes, U.S. Pat. No. 3,980,605 patented Sept. 14, 1976, provides semipermeable membranes made from mixtures of polyamides, especially N-alkoxyalkyl polyamides, and water-soluble polyvinyl alcohols. The membranes are preferably formed as hollow fibers. The membranes can be made from compositions containing the polymer components and a di (lower alkyl) sulfoxide, e.g., dimethyl sulfoxide. The membranes may contain complex-forming metal components. The membranes are useful for separating chemicals from their mixtures by techniques using an aqueous liquid barrier and complex-forming metals, e.g., for the separation of ethylenically unsaturated hydrocarbons such as ethylene from close-boiling hydrocarbons, but such membranes have pore sizes too small to provide flow rates useful in particulate and bacteria filtration.

Most available membrane sheets have the same wetting properties as the starting polymer, and are not readily wetted by water, i.e., hydrophobic, nor are they wetted by a wide range of organic liquids. Synthetic resin membrane sheet has almost invariably been made of hydrophobic synthetic resin, and retains the wetting characteristics of the polymer from which it has been made. The cellulose ester membranes are also hydrophobic. Of the previously available membrane sheets useful in the particle separation range, only regenerated cellulose sheet and alcohol-soluble polyamide membrane sheet are hydrophilic, i.e., wettable by water.

Brooks, Gaefke and Guibault, U.S. Pat. No. 3,901,810, proposed a way around this problem, by preparing ultrafiltration membranes made from segmented polymers having distinct hydrophilic portions and hydrophobic portions. Brooks et al suggest that if the casting solvent be a better solvent for the hydrophilic polymer segments than for the hydrophobic segments, the resulting film or membrane will display a gross morphology in which the hydrophilic portion of the system exists as a continuous phase while the hydrophobic portion is present as a disperse phase. The membrane system will include segregated domains of hydrophobic segments dispersed in a background of the hydrophilic polymer segments. By the same token, if a casting solution is selected such that it is a better solvent for the hydrophobic polymer segments than for the hydrophilic segments, the phase relationships in resulting films will be reversed and the film will not function as a membrane for aqueous media but will behave more as a hydrophobic film displaying virtually no water permeability.

However, this expedient merely utilizes combinations of hydrophilic and hydrophobic groups to achieve water permeability, and does not suggest a way of modifying normally hydrophobic groups to improve water permeability of hydrophobic polymers. Polyamides are not referred to by Brooks et al as acceptable membrane materials for their invention.

Yamarichi et al, U.S. Pat. No. 4,073,733, describe a hydrophilic polyvinyl alcohol hollow fiber membrane with a relatively uniform pore size distribution in the range from 0.02 to 2 microns, but these pores are not interconnected, and the product serves for separation in the dialysis (high molecular weight dissolved compound) range, rather than as a particle or bacterial filter.

To be useful in filter applications, membrane sheet must be adequately wetted by the continuous liquid phase of the media to be filtered, but this is not always easy to accomplish. Surface-active agents can be added to the medium being filtered, to enable the medium to wet the sheet sufficiently to penetrate it for filtration. However, the addition of foreign materials such as surface-active agents is not possible or desirable in many applications, as for example, in assaying bacteria, since some bacteria are killed by surface-active agents. In other applications, filtering media cannot be adulterated by the addition of surface-active agents without deleterious consequences.

In accordance with the invention of Ser. No. 198,569, filed Oct. 20, 1980, alcohol-insoluble polyamide resin membrane sheet is provided that is inherently hydrophilic. This is a most remarkable property, inasmuch as the alcohol-insoluble polyamide resin from which the sheet is made is hydrophobic. The phenomenon occurs only with alcohol-insoluble polyamide resins having a ratio $CH_2$:NHCO of methylene $CH_2$ to amide NHCO groups within the range from about 5:1 to about 7:1. The reason why such polyamide resin membrane sheet prepared in accordance with the process of the invention is hydrophilic is not at present understood, but it appears to be due to a spatial orientation of the hydrophilic groups of the polymer chain that is fixed in the solid polymer membrane surface as a result of the precipitation process. It may be related to crystal structure or to solid structure, or to some spatial form of the NH and/or CO groups on the surface of the membrane sheet, facilitating its being wetted by water. The fact is that a drop of water placed on a dry polyamide resin membrane sheet of the invention will penetrate into the sheet and disappear within a few seconds. A sheet of the dry membrane placed on the surface of a body of water will be wetted through and may even sink in the water within a few seconds. If the membrane is completely immersed in water, the membrane is wetted through in less than a second.

The capability of a membrane's or substrate's being wetted by water is determined by placing a drop of water on the membrane or substrate surface. The angle of contact provides a quantitative measure of wetting. A very high angle of contact indicates poor wetting, while a zero angle of contact defines complete or perfect wetting. The polyamide resin from which the membranes of this invention are made have a low angle of contact, and are readily wetted by water.

The wettability of these membranes is not a function of retained water. Membrane specimens dried at 350° F. for 72 hours in an inert atmosphere, in vacuum, and in air, are unchanged with respect to wettability by water. If, however, they are heated to a temperature just below the softening temperature of the membrane (to heat at a higher temperature would of course destroy the membrane, since it would melt), the membrane reverts to a hydrophobic material, which is no longer wetted by water. This suggests that the hydrophilicity is a function of solid structure, and is obtained by the process of membrane formation, probably during precipitation of the membrane in the course of the process. It may be associated with crystal structure, or it may only be associated with noncrystalline or amorphous solid structure, but it does appear to be related to a physical orientation of the hydrophilic groups in the polyamide chain, which orientation is lost when the membrane film is heated to a high enough temperature to permit reorientation to a normal configuration, in which the material is hydrophobic.

It follows, of course, that during processing and drying it is important not to heat the membrane above this temperature.

A further important characteristic of the polyamide resin membrane sheets of the invention is their high flexibility. In the normal thickness range in which they are useful, in the absence of an extreme state of dryness, they can be folded back and forth on themselves several times, without harm, and without the addition of a plasticizer.

In accordance with the present invention it has now been determined that the membrane sheets of the next-adjacent class of polyamides, polyamide resins having a ratio $CH_2:NHCO$ of methylene $CH_2$ to amide NHCO groups within the range from about 7:1 to about 12:1, also display unusual wetting properties that are different from the starting polyamide. This class of polyamides when converted into membrane sheets by the process of the invention are not readily wetted by water, but they are readily wetted by organic liquids having a surface tension below about 60 dynes/cm. They accordingly can be used for filtration of liquid media in which such liquids are the continuous phase, as well as for the separation of liquid media containing such liquids admixed with liquids such as water that are immiscible therewith and have a surface tension above this limit.

To distinguish the membrane sheets of the invention from prior membrane sheets that are fully hydrophobic, and not readily wetted by organic liquids having surface tensions up to about 60 dynes/cm, which class of organic liquids wet the membrane sheets of the invention, as well as the hydrophilic membrane sheets of Ser. No. 198,569, filed Oct. 20, 1980, the membrane sheets of the invention are referred to as liquophilic membrane sheets, in contrast to the prior membrane sheets that are liquophobic.

Accordingly, the term "liquophilic" as used in the specification and claims means that the membrane sheet is readily wetted by organic liquids having a surface tension within the range from about 40 to about 60 dynes/cm, measured at room temperature, 25° C.

The process of the invention for preparing skinless liquophilic alcohol-insoluble polyamide membranes comprises preparing at a first or dissolution temperature a solution in a polyamide solvent having a temperature coefficient of solubility within the range from about 0.01 to about 5 weight percent per degree Centigrade of an alcohol-insoluble polyamide resin having a ratio $CH_2:NHCO$ of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate and degree of agitation to obtain a visible precipitate of polyamide resin particles which may or may not thereafter partially or completely redissolve, thereby forming a casting solution; spreading the casting solution on a substrate to form a thin film thereof on the substrate; cooling the film of casting solution to a second or gelation temperature sufficiently lower than the first temperature to precipitate polyamide resin from the casting solution; contacting and diluting the film of casting solution with a nonsolvent liquid to precipitate polyamide resin from the casting solution in the form of a thin skinless liquophilic membrane; and washing and drying the resulting membrane. After washing, the membrane can be stripped off of the substrate and dried, or if the substrate is porous, it can be incorporated in the membrane or attached to the membrane to serve as a permanent support in which case it can be dried with the membrane.

The nonsolvent liquid used to dilute the casting solution can and preferably does contain a substantial proportion of the solvent liquid, but less than the proportion in the casting solution.

An important feature of the process of the invention is the preparation at a first or dissolution temperature of a solution of the alcohol-insoluble polyamide resin in a polyamide solvent having a temperature coefficient of solubility within the range from about 0.01 to about 5 weight percent per degree Centigrade, and then, after inducing nucleation of the solution by addition to the solution of a nonsolvent for the polyamide resin under controlled conditions, cooling the film of casting solution to a second or gelation temperature, lower than the first temperature, and contacting and diluting the film of casting solution with a nonsolvent liquid. The combined cooling and dilution result in a thermal gelation, in contrast to the desolvation mechanism which results when only dilution with nonsolvent and/or solvent is used, in precipitation of the polyamide resin from the casting solution in the form of a thin skinless liquophilic membrane.

The conditions under which the polyamide resin is precipitated determine the skinless nature of the membrane, as well as its physical characteristics, i.e., the size, length and shape of the through pores of the membrane. Under certain conditions, a membrane is formed which has through pores extending from surface to surface that are substantially uniform in shape and size. Under other conditions, the through pores are tapered, being wider at one surface and narrowing towards the other surface of the membrane.

Under conditions outside the scope of the invention, still another form of the membrane is obtained, having a dense skin penetrated by pores of smaller diameter than the pores in the remainder of the sheet. This skin is normally on one side of the membrane sheet, but it can be on both sides of the membrane sheet. Such skinned membranes are conventional in the art, exhibit relatively higher pressure drop and other poor filtration characteristics, and are undesirable.

Thus, by control of the method by which the casting resin is nucleated, and of the precipitation conditions, it is possible to obtain liquophilic polyamide resin membranes with through pores of desired characteristics, either uniform from face to face, or tapered, with larger pores on one face transitioning to finer pores on the other face.

The formation of a liquophilic polyamide membrane having uniform pores or tapered pores without a skin on either surface is also remarkable. As shown by the Michaels U.S. Pat. No. 3,615,024, and Marinaccio et al U.S. Pat. No. 3,876,738, precipitation of a polyamide resin membrane in a nonsolvent is known to result in a skinned membrane. Only in the formation of the hydrophilic skinless polyamide resin membranes by the process of Ser. No. 198,569, filed Oct. 20, 1980, has a skinless membrane previously been achieved.

In a preferred embodiment of this process, the solvent for the polyamide resin solution is formic acid maintained at a temperature of at least 50° C. and the nonsolvent is water, and the polyamide resin solution film is allowed to cool in air for at least 10 seconds followed by contact with the nonsolvent by immersing the film carried on the substrate in a bath of nonsolvent comprising water containing a substantial proportion of formic acid.

The invention in another preferred embodiment provides a process for preparing skinless liquophilic alcohol-insoluble polyamide membrane sheets having pores that are substantially uniform from surface to surface, which comprises preparing at a first or dissolution temperature a solution in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; removing any undissolved resin by filtration; spreading the casting solution on a substrate to form a thin film thereof on the substrate; cooling the film of casting solution to a second or gelation temperature sufficiently lower than the first temperature to precipitate polyamide resin from the casting solution; contacting and diluting the film of casting solution with a nonsolvent liquid to precipitate polyamide resin from the casting solution in the form of a thin skinless liquophilic membrane; and washing and drying the resulting membrane.

Further, a continuous process is provided for preparing skinless liquophilic alcohol-insoluble polyamide membranes which comprises preparing at a first or dissolution temperature a solution in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate, and degree of agitation to obtain a visible precipitate of polyamide resin particles thereby forming a casting solution; removing any undissolved resin by filtration; spreading the casting solution on a substrate which is nonporous and whose surface is wetted by the casting solution to form a thin film thereof on the substrate; cooling the film of casting solution to a second or gelation temperature sufficiently lower than the first temperature to precipitate polyamide resin from the casting solution; contacting and diluting the film of casting solution with a nonsolvent liquid, preferably containing a substantial proportion of the solvent liquid, but less than the proportion in the casting solution, to precipitate polyamide resin from the casting solution in the form of a thin skinles liquophilic membrane; and continuously washing and drying the resulting membrane, while maintaining constant the relative proportion of solvent and nonsolvent liquid in the bath. In a preferred embodiment, the rates of withdrawal and addition of solvent and nonsolvent to and from the bath are maintained substantially constant.

The invention further provides a process for preparing skinless liquophilic alcohol-insoluble polyamide membrane sheets having multimembrane layers, which comprises preparing at a first or dissolution temperature at least two starting solutions in a polyamide solvent having a temperature coefficient of solubility within the range from about 0.01 to about 5 weight percent per degree Centigrade of an alcohol-insoluble polyamide resin having a ratio $CH_2$: NHCO of methylene $CH_2$ to amide NHCO groups within the range from about 7:1 to about 12:1; inducing nucleation of the solution by controlled addition to the solutions of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; removing any undissolved resin by filtration; spreading the casting solutions on a substrate to form thin films thereof on the substrate; cooling the films of casting solution to a second or gelation temperature sufficiently lower than the first temperature to precipitate polyamide resin from the casting solution; contacting and diluting the films of casting solution with a nonsolvent liquid, preferably containing a substantial proportion of the solvent liquid, but less than the proportion in the casting solution; to precipitate polyamide resin from the casting solution in the form of a thin skinless liquophilic membrane; washing the resulting two membranes; combining the two membranes so formed as a dual layer; and drying the dual layer under conditions of restraint to prevent more than minor reduction of the length and width of the membrane; the membranes so dried forming a single sheet with particle removal characteristics superior to those of individual layers.

The membranes thus attached can have the same or differing porosities, and the membrane layers can be selected from membranes having tapered pores and membranes having uniform pores, in any combination, supported or unsupported.

The two combined membranes can be obtained from a single roll of filter medium, and when combined with matching faces in contact form a sheet which is symmetical, and which provides equal filtration characteristics regardless of which face is upstream.

The invention also provides several types of polyamide resin membrane products. One preferred embodiment is a liquophilic microporous polyamide membrane comprising a normally liquophobic polyamide resin in a solid structure that is liquophilic, having absolute removal ratings within the range from about 0.1 $\mu M$ to about 5 $\mu M$, and a thickness within the range from about 0.025 mm to about 0.8 mm.

These liquophilic microporous polyamide resin membranes can have pores extending from surface to surface in a relatively uniform structure, or in a tapered pore structure.

Also provided are liquophilic polyamide resin membranes that are supported by the substrate on which the polyamide resin membrane is formed, either imbedded therein, or having the substrate attached to one face thereof.

In addition, the invention provides microporous liquophilic polyamide resin membrane composites having a plurality of liquophilic polyamide resin membrane layers, formed by membranes prepared separately by precipitation on separate substrates and then bonded together by drying two or more layers maintained in close contact.

In all of these embodiments, the polyamide resins have a ratio $CH_2:NHCO$ of methylene $CH_2$ to amide NHCO groups within the range from about 7:1 to about 12:1 preferably from about 8:1 to about 10:1. The preferred polyamide resins are poly-11-aminoundecanamide (Nylon 11, polymer of 11-amino-undecanoic acid) and polyhexamethylene dodecandiamide (Nylon 612). Also useful is polyhexamethylene tridecandiamide (Nylon 613), and mixtures of two or more such polyamides, as well as mixtures thereof with lower or higher polyamide homologues such as poly-ε-caprolactam (Nylon 6), polyhexamethylene sebacamide (Nylon 610), poly-7-aminoheptanoamide (Nylon 7), and polyhexamethylene azeleamide (Nylon 69), in proportions such that the mixture has an average $CH_2:NHCO$ ratio within the stated range.

Figure 2:
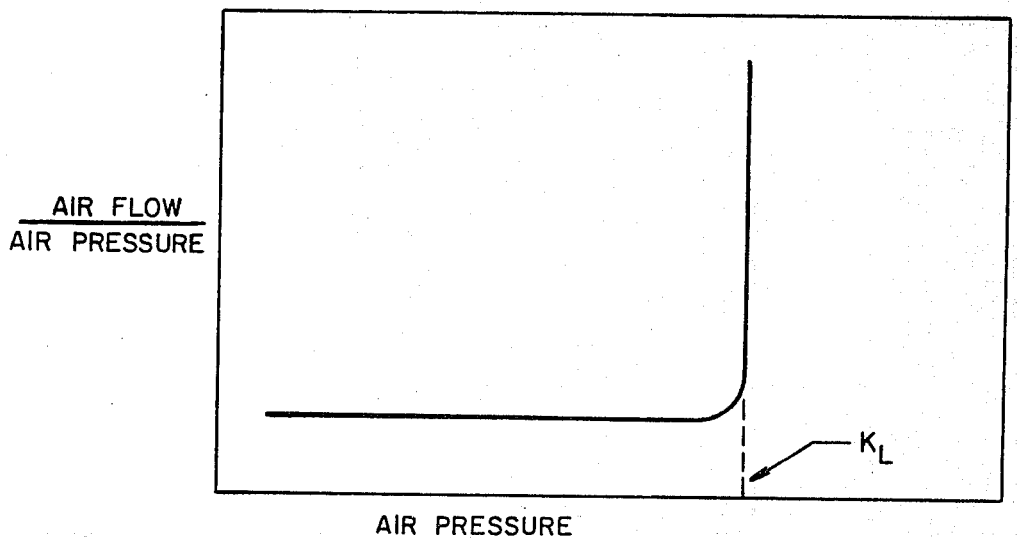
FIG. 2 is a graph showing the relationship obtained when a membrane wetted by a liquid with surface tension below 60 dynes/cm is pressurized by a gas, and the ratio (air flow/air pressure) is plotted against air pressure applied. The quantity $K_L$ is defined by the broken line.
Figure 4:
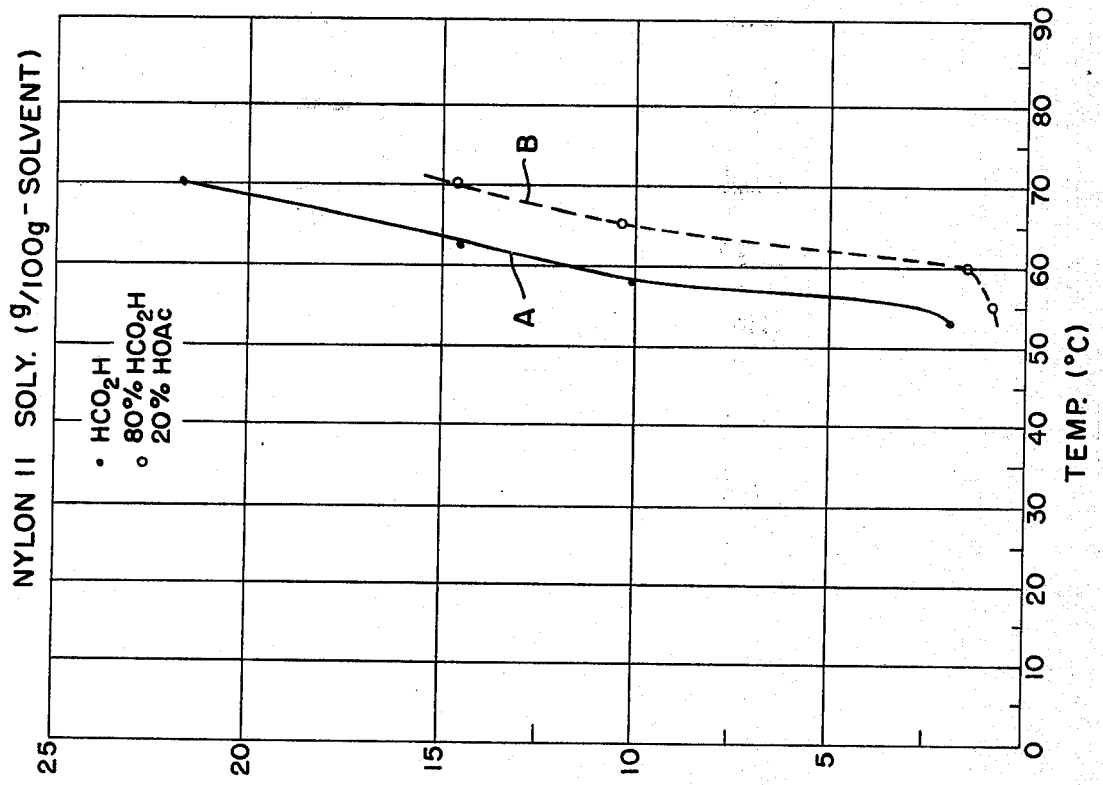
Figure 3:
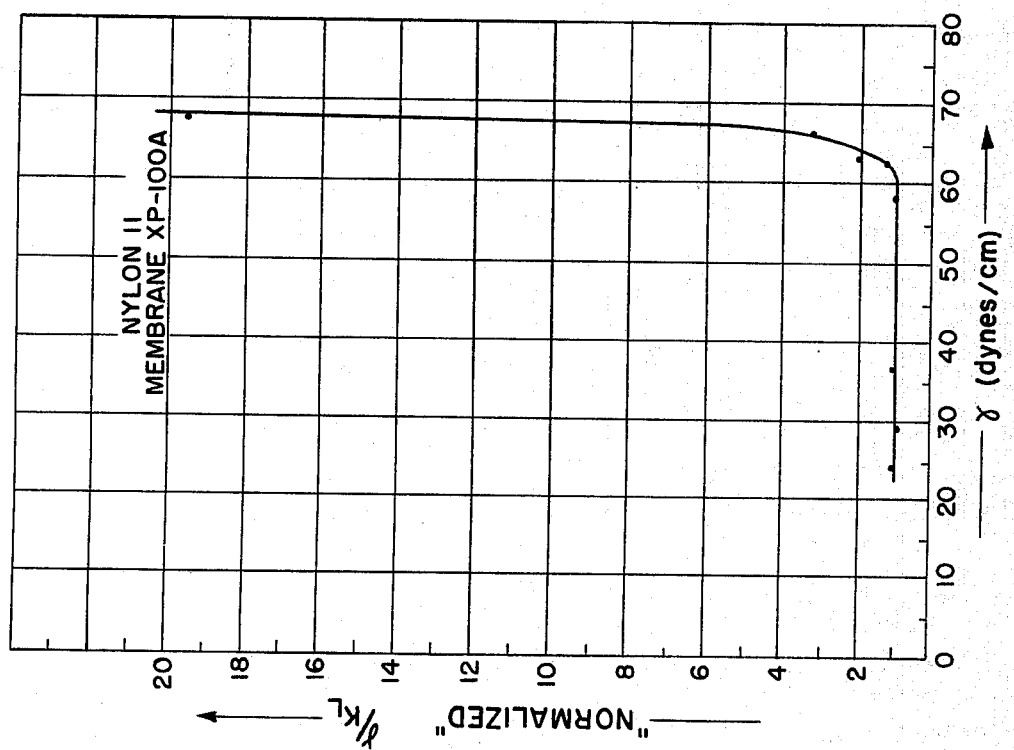
FIG. 3 is a graph showing the relation between surface tension and $K_L$, where

γ is the surface tension, measured in dynes/cm;

$K_L$ is the pressure, measured in psi, at which air flow through the liquid wet membrane increases very sharply (see FIG. 2);

"Normalized $\gamma/K_L$" is the numerical value of this ratio for any given experimental point divided by the average value of $\gamma/K_L$ for the flat portion of the curve;

The curve of FIG. 3 represents the results of measuring the $K_L$ and surface tension for different liquids; and FIG. 4 is a graph representing the temperature coefficient of solubility of Nylon 11 in 80:20 concentrated formic acid and concentrated acetic acid.

While the various polyamide resins of the invention are all polymers of a diamine and a dicarboxylic acid having from nine to sixteen carbon atoms or homopolymers of an amino acid having from nine to sixteen carbon atoms; they can vary widely in crystallinity or solid structure, melting point, and other physical properties. It has been determined in accordance with the invention that the application of the process of the invention to polymers of hexamethylene diamine and dodecane dicarboxylic acid (Nylon 612) and to homopolymers of poly-11-amino undecanoic acid (Nylon 11) readily produces skinless liquophilic alcohol-insoluble polyamide resin membranes. For reasons which are not understood, these polyamide resins are quite susceptible to precipitation under the process conditions of the invention to form liquophilic membrane sheets.

These polymers are available in a wide variety of grades, which vary appreciably with respect to molecular weight, and in other characteristics. The formation of a liquophilic membrane appears to be a function not of these characteristics, but of the chemical configuration of the polymer, i.e., the arrangement and chain length of the units composing the polymer chain. The preferred species of the units composing the polymer chain is poly11-amino-undecanamide.

Polymers free of additives are generally preferred, but the addition of antioxidants or similar additives may have benefit under some conditions; for example, addition of the antioxidant Ethyl 330 (1,3,5-trimethyl-2,4,6-tris [3,5-di-tert-butyl-4-hydroxyl benzyl] benzene) has been shown to extend the life of polyamide membranes exposed to extreme oxidative hydrolytic conditions.

The polyamide resin solution from which the polyamide membrane film is precipitated can be a solution in any solvent for the polymer. These solvents are well known, and are themselves no part of the instant invention. A preferred solvent is hot formic acid, at any temperature from 50° C. to boiling, but hot dimethyl sulfoxide, as well as phenols such as phenol and its derivatives, such as cresol, can also be used; also dimethyl formamide; and various higher primary alcohols; and also inorganic acids, such as phosphoric acid and sulfuric acid.

Other suitable solvents are: other liquid aliphatic acids such as acetic acid and propionic acid, and halogenated aliphatic acids such as trichloroacetic, trichloropropionic, chloroacetic and dichloroacetic acids; halogenated phenol derivatives; inorganic acids such as hydrochloric and hydrofluoric; saturated aqueous or alcohol solutions of alcohol-soluble salts such as calcium choride, magnesium chloride and lithium chloride; hydroxylic solvents including halogenated alcohols (trichloroethanol, trifluoroethanol), benzyl alcohol, and polyhydric alcohols such as ethylene glycol, propylene glycol, and glycerol; and polar aprotic solvents such as ethylene carbonate, diethyl succinate, dimethyl sulfoxide and dimethyl formamide. The solvent selected can be diluted with a minor proportion (less than about 50%) of a miscible non-solvent, short of the point of incipient precipitation of polymer.

The polyamide resin solution, hereafter referenced as the starting resin solution, is prepared by dissolution of the polyamide resin to be used in the membrane in the desired solvent. The resin is dissolved in the solvent at a first temperature that is well above the second temperature of precipitation or thermal gelation. The temperature increment is not critical.

In general, the first or dissolution temperature will be from about 25° C. to about 200° C. above the second or gelation temperature, preferably, for operating convenience and solubility differential, from about 40° to about 100° C. above the second or gelation temperature. Also for operating convenience, the second or gelation temperature is normally room or ambient temperature, from 20° to 35° C. However, second temperatures below ambient temperature can be used. Temperature down to as low as −10° C. are easily achieved, but normally temperatures below −40° C. would not be used. In such cases, the first temperature can be ambient.

The solvent and nonsolvent and amounts thereof as well as the first of dissolution temperature are so selected from the polymer solution contains at least 10% by weight of polymer. There is no critical upper limit.

The temperature coefficient of solubility of the solvent is taken into account in selecting the first or dissolution temperature, keeping in mind the above requirement, and the second or gelation temperature selected for operation of the film formation steps. The temperature coefficient of solubility as the term is used herein is the increment or difference in polymer solubility for each temperature difference of one degree Centigrade, expressed as weight percent. The solvent should have a temperature coefficient of solubility within the range from about 0.1 to about 5 weight percent per degree Centigrade. Solvents whose temperature coefficient of solubility is less than 0.1, within the range from about 0.01 to about 0.1 weight percent per degree Centigrade, can be used if more nonsolvent is added, and the film is immersed in a bath containing the nonsolvent or nonsolvent-solvent mixture held at the second temperature.

If the starting resin solution is to be stored for more than a few hours, water in excess of about 1 to 2% should not be present, as otherwise a slow hydrolysis of the polyamide resin takes place, resulting in an undesirable reduction in molecular weight of the polymide. In general, the amount of water in this event should be less than 2%, and preferably the solution is water-free. If water or formic acid-water mixture is added to accomplish nucleation, it can be added just prior to casting, preferably within about five to sixty minutes of the casting operation.

The casting resin solution is prepared from the starting resin solution by diluting it with a nonsolvent, or with a mixture of solvent and nonsolvent. The state of nucleation of the resulting casting resin solution is strongly affected the the following factors:

(1) Concentration, temperature and molecular weight of the starting resin solution.
(2) Composition and temperature of the nonsolvent, or of the nonsolvent-solvent mixture.
(3) The rate at which the nonsolvent, or nonsolvent-solvent mixture, is added.
(4) The intensity of mixing during the addition.
(5) The geometry of the apparatus in which the mixing is accomplished.
(6) The temperature of the resulting casting resin solution.

The casting resin solution so prepared is then formed into a thin film by casting it onto an appropriate substrate, and the film is brought to the second or gelation temperature to effect precipitation. The film then can, optionally, be immersed with minimum delay into a bath containing a nonsolvent for the polyamide resin, usually, but not necessarily, together with a substantial proportion of solvent for the resin and also brought to the second or gelation temperature.

The stability of the casting resin solution varies greatly depending on the method used to prepare it. For example, casting resin solution prepared under small scale batch conditions tends to be relatively unstable; for example, the characteristics of the membranes it produces will be quite different if it is cast as long as five to ten minutes after it has been prepared, or it may transform to a noncastable semi-solid gel within 10 minutes or less. On the other hand, casting resin solution prepared using a continuous in-line mixer, which can produce a membrane of equal characteristics, tends to be stable for a period of an hour or more. Casting resin solutions prepared in this way should, however, be used within an hour or less, particularly if maintained at elevated temperature, to prevent substantial reduction in molecular weight of the polyamide resin which will otherwise occur due to the presence of water in the acid solution, with resultant hydrolysis.

Either of the above methods may be used to produce casting resin solutions which function equally when cast as membranes, and regardless of which is used the addition of the nonsolvent is accompanied by the appearance of a visible polyamide resin precipitate, in order to produce a useful, properly nucleated casting resin solution. Casting resin solutions prepared by other means, for example, by dissolving the resin pellets in a solution of formic acid and water, or by adding the nonsolvent in a manner such as not to produce such a precipitate, do not produce useful membranes.

Useful membranes are those with uniform or tapered pore structures, skinless with permeabilities to air and water such that substantial quantities of fluids can be passed at low pressure differentials, while providing a required degree of filtration.

It is an important feature of this invention, that the conditions are described for achieving a casting solution with controlled degree of nucleation to make membranes with useful pressure drop characteristics.

We use herein the terms "nucleation" and "state of nucleation" to account for the discovery that (a) casting resin solutions can be prepared with a wide variation of composition with respect to resin, solvent, and nonsolvent concentrations, which yield identical or nearly identical membranes; and
(b) casting resin solutions can be prepared, which have equal resin, solvent and nonsolvent concentrations, which are then cast at equal temperatures into the same bath, yet yield very different membranes.

Since the preparation of casting resin solutions capable of producing membranes will flow properties in the useful range has been observed to invariably be accompanied by the local precipitation and at least partial redissolution of solid resin, and since it is well known to those familiar with the chemical arts that the characteristics of a solid precipitated from solution can be greatly influenced by the presence or absence of submicroscopic nuclei, we have chosen to use the term "state of nucleation" to distinguish casting solutions having equal composition, but diverse results, as described in paragraph (b) above, and to account as well for the observation of paragraph (a).

It should, however, be understood that we have not unquestionably established that nucleation is the only explanation for the observed results, and that they could be caused by phenomena other than nucleation.

The viscosity of the casting resin solution is preferably adjusted to between about 500 centipoises and 5000 centipoises at the temperature existing at the time it is cast as a film. Viscosities much above 5000 cp, for example, 100,000 cp, are not needed to obtain a smooth, coherent cast film, but are helpful in casting membranes where no substrate is used, for example, hollow fibers, or unsupported film.

Solutions of a viscosity well above 5000 cp at the casting temperature can be cast without difficulty, however, the preferred viscosity limit is about 5000 cp, since at higher viscosities the energy input to the mixture when a nonsolvent is blended with the polyamide resin solution is very high, with the result that the solution can reach excessively high temperature, with ensuing operating problems. Moreover, the pumping of the starting polyamide resin solution to the casting operation becomes progressively more difficult, as viscosity increases. Also, manipulation of the casting resin solution within the reservoir from which the resin is cast as a film on the substrate becomes troublesome, if the viscosity is very high. When a porous substrate is used, with the intention of completely impregnating it with casting resin solution, viscosities much above about 3000 cp can cause improper penetration, and the resulting product has undesirable voids.

The temperature of the casting resin solution is critical, but only insofar as it must be maintained above the second or gelation temperature at which the resin would precipitate. FIG. 4 illustrates this point for the case of Nylon 11 resin dissolved in concentrated formic acid (Curve A) and 80:20 formic acid: acetic acid (Curve B). Note that the solubility of Nylon 11 in these solvents is well below 5 gm/100 gm solvent, at temperatures below about 55° C.

As the cast film is cooled, a thermal gelation and precipitation process occurs, whose mechanism is not completely understood. Obviously, the membrane must begin to precipitate as the point of incipient precipitation is reached and exceeded, but it is not understood why this results in a uniform pore size throughout the thickness of the film. However, it is known that if the cooling period is too short (less than about 10 seconds), then the resulting membrane is heavily skinned, regardless of the composition of the optional immersion bath. Conversely, when a relatively long cooling interval is provided, upwards from 30 seconds, with no upper limit apart from convenience uniform pore size can be achieved even if no solvent is included in the immersion bath. Moreover, it is not understood why a uniform pore size is likewise obtained when precipitation is completed in a bath wherein the solvent-nonsolvent ratio is held within certain limits.

The formation of the membrane from a casting resin solution can be carried out as an intermittent or batch operation or as a continuous or semicontinuous process. A small scale operation may be most conveniently carried out as a batch operation, while at high production rates a continuous or semicontinuous operation is more convenient. In all types of processes, it is important to carefully control all of the operating parameters to ensure a uniform product, including operating temperatures, and relative proportions of resin solution and nonsolvent liquid. The control of conditions of non-solvent addition are critical including the geometry of the apparatus, the rates of flow, and duration and intensity of mixing; also the interval between nonsolvent addition and casting of the resin film must be controlled. The duration and temperature of the cooling interval following casting are of particular importance. Such controls can be established by trial and error experimentation without undue difficulty by those skilled in this art, taking into account the following considerations:

It is important that the casting resin solution be clear, and free from suspended material, before being spread upon the substrate to form a film. If suspended material is present, such as undissolved resin particles, these are removed by screening or filtration before casting.

Any type of substrate or support can be used as a surface on which the casting resin solution is cast to form the solution film. If a nonsupported membrane film is the desired product, then the substrate should have a surface to which the membrane does not adhere, and from which the membrane film can readily be stripped at the conclusion of the drying operation. Strippability usually requires that the substrate surface be smooth-surfaced, and nonporous. When the solvent is one with a relatively high surface tension, such as formic acid, and the nonsolvent also has a relatively high surface tension (as, for example, water), it is important that the nonporous surface on which the film is cast be wettable, i.e., have zero or near zero angle of contact, when contacted by the casting resin solution, and preferably also by the bath as well. Failing this condition, a skin will form on the membrane on the substrate side, with undesirable effect on membrane properties. Such temporary substrate or support surfaces can be of a suitable material, such as glass, metal or ceramic. Plastics, such as polyethylene, polypropylene, polyester, synthetic and natural rubber, polytetrafluoroethylene, polyvinyl chloride, and similar materials are not inherently suitable, as they are not wetted by the casting resin and nonsolvent, but these can be rendered suitable by application of an appropriate surface treatment. A corona discharge can, for example, be used to treat Mylar (polyester)film, and polypropylene. The substrate can be made of or merely surfaced with such materials.

If the substrate is to form a part of the final membrane film, as a permanent supporting layer, then it should be of porous material that preferably is wetted by the casting resin solution, so that the casting resin solution will penetrate it during the casting of the solution on the substrate, and become firmly attached thereto during precipitation of the polyamide membrane film. It is not essential however that the substrate be wetted; if it is not wetted, the polyamide resin film will be largely confined to the surface of the support, but is nonetheless adherent thereto. Such substrates can, for example, be of nonwoven or woven fibrous material, such as nonwoven mats and bats, and woven textiles and cloth, as well as netting of various types, including extruded plastic filament netting, papers, and similar materials.

As permanent supports which are not wetted by the casting resin solution, fine-pored nonwoven webs can be used, made from fibers with poor wetting characteristics, such as, for example, polypropylene or polyethylene. The resin solution is cast as a film onto the nonwoven web, and since it does not wet the fibers of the web, it is carried on its surface. The substrate carrying the heated casting resin solution film on its lower surface is allowed to cool, for example in the ambient atmosphere, to initiate precipitation, and is then (optionally) plunged into a bath of nonsolvent liquid, or allowed to float on the surface of the bath, thereby completing the precipitation process. The resulting film has good adhesion to the substrate, and the substrate has very little or no effect on the pressure drop for fluid flow through the membrane.

In the case of permanent supports which are wetted by the casting resin solution, the fibers of which the substrate is made should have a sufficiently high critical surface tension, that the casting resin solution film will completely permeate the supporting web, and the resulting membrane precipitates in and around the fibrous material, and is permanently supported thereby, since the material of the support is embedded in the membrane. The resulting membrane has a somewhat higher pressure drop when tested with flowing fluid, but the increase compared with the unsupported membrane is small, if the supporting web has an open structure.

Suitable wetted substrates that can serve as permanent supports for the membrane include polyesters, as a nonwoven fibrous web or as a woven web, using monofilament or multifilament yarn, the monofilaments being preferable in terms of open structure and lower pressure drop; also polyamide fiber woven webs, woven and nonwoven webs of aromatic polyamides such as Nomex, and other relatively polar fibrous products such as cellulose, regenerated cellulose, cellulose esters, cellulose ethers, glass fiber, and similar materials.

Cellulosic and synthetic fiber filter papers can be used, as well as perforated plastic sheets, and open mesh expanded plastics such as Delnet or similar extruded and thereafter expanded nettings. If the substrate is relatively coarse or in a very open weave structure, even if the fibers are not well wetted by the resin solution, the substrate may nonetheless be embedded or embraced by the membrane material in the final supported membrane product; such relatively poorly wetted materials as polypropylene and polyethylene can function as embedded substrates if they have a sufficiently open structure. If a polyolefin substrate has a relatively smaller pore size, for example, about 30 microns, the casting resin solution will not penetrate into it, but will instead form a membrane external to, but adhered to, the polyolefin substrate.

In a continuous process, the substrate can be in the form of an endless belt, which circulates through the entire film-forming operation, from casting of the casting resin solution film; its subsequent passage through an atmospheric cooling section to reduce the temperature to the second or gelation temperature effect precipitation and then optionally, into and through a precipitating bath of the nonsolvent liquid, and finally through the bath liquid removal step. A corrosion resistant metal drum, or endless metal belt can be used, but the surfaces on which the film is cast should be treated or coated so as to make them wettable.

The nucleated casting resin solution can be cast or spread out upon the substrate in the desired film thickness using a conventional doctor blade or roll, kissing or squeeze rolls or other conventional devices.

The choice of nonsolvent liquid depends upon the solvent utilized. Water is a preferred nonsolvent. Other nonsolvents include formamides and acetamides, dimethyl sulfoxide, acetic acid and other water miscible carboxylic acids, and similar polar solvents, as well as polyols such as glycerol, glycols, polyglycols, and ethers and esters thereof, and mixtures of such compounds. Salts can also be added.

Following precipitation, the membrane film is washed to remove solvent. Water is suitable, but any volatile liquid in which the solvent is soluble and that can be removed during drying can be used as the washing liquid.

One or several washes or baths can be used as required to reduce solvent content to below the desired minimum. In the continuous process, wash liquid flow is countercurrent to the membrane, which can, for example, be passed through a series of shallow washing liquid baths in the washing stage.

The amount of washing required depends upon the residual solvent content desired in the membrane. If the solvent is an acid such as formic acid, residual formic acid can cause hydrolysis during storage of the polyamide of which the membrane is composed, with a consequent reduction in molecular weight; therefore, the washing should be continued until the formic acid level is low enough to prevent any significant hydrolysis during the anticipated storage period.

The drying of the washed membrane film requires a technique that takes into account the tendency of the membrane to shrink linearly when dried unsupported, with the result that the dried membrane film is warped. In order to obtain a flat uniform film, the membrane must be restrained from shrinkage during drying. One convenient way to do this, is to roll up a continuous web on a plastic or metal core, with a high degree of tension so as to obtain a tight roll, then firmly wrap this with a rigid but porous outer wrap, and then dry the assembly. Other methods of preventing shrinkage, such as tentering, or drying in drums under felt, are also satisfactory.

Individual membrane sheets of a selected size can be dried to produce flat sheets free of warpage by clamping the sheets in a frame restraining the sheet from shrinkage on all four sides, and then heating the framed membrane at elevated temperature until it has been dried. We have discovered that two or more equally sized membrane sheets can be placed in contact and dried together in a frame to prevent shrinkage. When this is done, the contacting layers adhere to each other, and can thereafter behave as though they were a single sheet. When the individual starting sheets are relatively thin, e.g. under 0.005 inch thick, and are of the unsupported (substrate free) type, they may be subsequently cut to size, for example, by steel rule dies, and are thereafter for practical purposes a single sheet or disc of filter medium.

The membranes can be dried in any of the ways described above, and then corrugated, seamed to provide a closed cylinder, and end capped. We have discovered that this process can be greatly simplified, while producing a superior product, by corrugating the filter medium while it is still wet, together with upstream and downstream layers of dry porous material, this material being chosed to be relatively rigid, and subject to no more than a small shrinkage during the drying operation. The corrugated pack so formed is lightly compressed, so that the corrugations are in firm close contact, while being held in a holding jig, preferably one perforated to allow free access for heating and escape of vapor, and placed in an oven to dry. The resulting dried corrugated assembly shows only slight shrinkage, and the corrugated polyamide membrane so obtained is free of warpage, with well formed smooth corrugation crests, and flat faces between. When formed into a filtering element by side seaming and end capping, the porous support layers provide flow spaces for access of upstream (dirty) fluid and passage out of the element for downstream (clean) fluid.

If the filter cartridge is made using two or more thin layers of the polyamide membrane, these will be firmly adhered to each other at the conclusion of the drying operation, and behave mechanically as though they were a single layer.

The control of the subsequent precipitation so as to obtain the formation of a liquophilic polyamide membrane sheet of desired flow characteristics and pore size requires that the casting resin solution be controlled with respect to a characteristic referred to herein as "nucleation". The variables that must be controlled include the choice of resin and of solvent and nonsolvent, the concentration of the resin in the starting polyamide resin solution, temperatures of all components, the quantity and mode of addition of nonsolvent, including rate of addition, intensity of mixing during addition, and the geometry of the apparatus, the latter including especially size and location of the nozzle through which the nonsolvent is added. For a given resin, solvent and nonsolvent, the effect of these variables on the degree of nucleation is qualitatively stated in Table I.

TABLE I

Variables affecting degree of nucleation

| Type of Variable | Variable | Direction of change to obtain a higher degree of nucleation |
|---|---|---|
| Mixing Conditions | Temperature | Decrease |
| | Rate of nonsolvent addition | Increase |
| | Size of inlet opening through which the nonsolvent is fed | Increase |
| | Distance of the inlet opening from actual mixing area | Increase |
| | Intensity of mixing | Decrease |
| Concentration of the components in the casting solution | % of resin | Increase |
| | % of nonsolvent | Increase |
| Degree of nonsolvency of the nonsolvent | | Increase |

In Table I, the concentration of solvent is not included, as it is defined by the concentration of the resin and the nonsolvent.

It will be appreciated that the intensity of mixing in a given system is a function of a large number of variables. However, for a given system the relative intensity of mixing can be expressed in terms of the rotation rate of the agitator, or of the cutting blades of a homogenizer, etc. For a continuous production system (as opposed to a batch operation) an in-line mixer is required, and in a suitable designed multiblade mixer about ¼ to 2 hp is required to produce about 30 kg per hour of 2000 centipoise casting resin solution at a rotation rate between about 200 to 2000 rpm. Such equipment can take diverse forms, and can take any of a number of the designs commonly used in the mixing art, since the various mixing principles can all lead to similar results.

Because the intensity of mixing is difficult to quantify, transfer of manufacturing technology from batch systems to continuous systems requires trial-and-error experimentation, varying the operating condition parameters until one obtains the desired membrane sheet, all of which is within the capability of one skilled in this art, since it involves manipulation of variables that are customarily adjusted in chemical process industry manufacturing processes.

The nozzle diameter through which nonsolvent is delivered during preparation of the casting resin solution is also very important. It is at this nozzle that the precipitate forms, which at least in part subsequently redissolves, and the formation and complete or partial redissolution of the precipitate appears to play an essential role in the preparation of the casting resin solutions of this invention. With all other parameters maintained equal, a casting resin solution of quite different characteristics, in terms of the pore size of the resulting membrane, will be obtained by simply varying the diameter of the nozzle. We have used nozzle diameters varying from 0.013 inch to 0.125 inch diameter, but smaller or larger nozzles could be used with successful results.

Not only can a casting resin solution of given composition and temperature be made by varying the mixing intensity and thereby the degree of nucleation to produce greatly different membranes, but the converse is true, namely, membranes of equal or nearly equal characteristics can be made using a wide variety of resin, solvent, and nonsolvent concentration in the casting resin solution; for example, an increase in water content will increase the degree of nucleation, but if the mixing intensity is also increased, a casting resin solution will be obtained with the degree of nucleation unchanged, and the membrane cast from this casting resin solution will have characteristics equal to that made from the lower water content casting resin solution.

Figure 1:
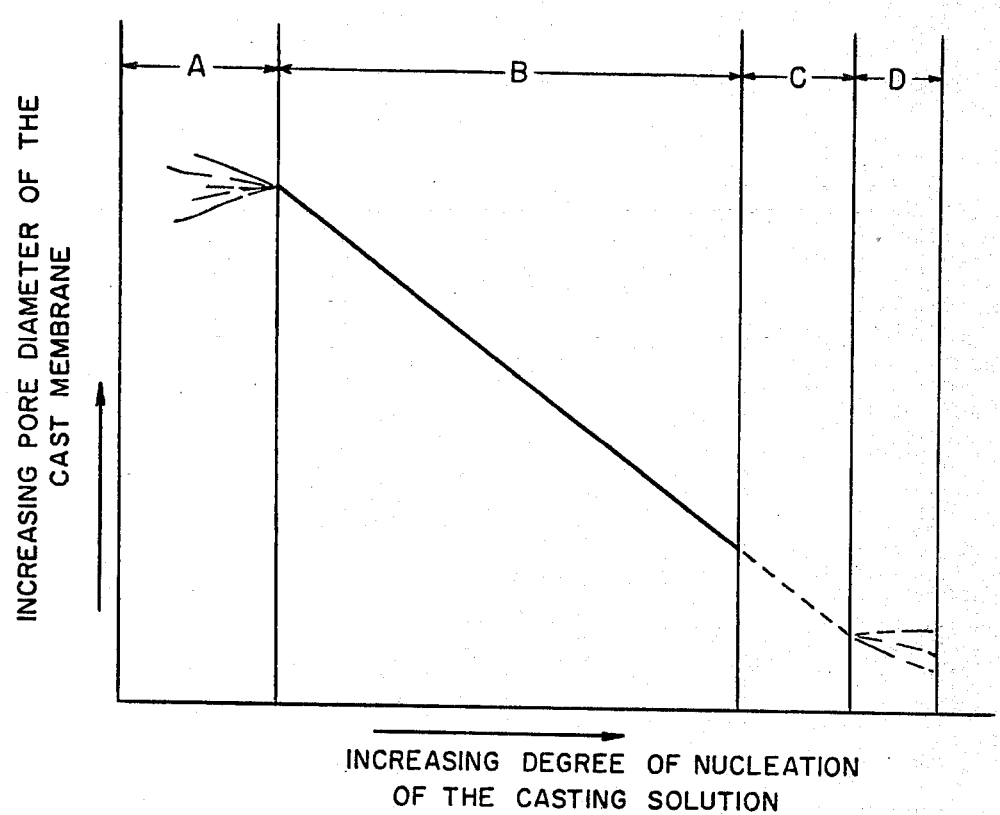
FIG. 1 is a graph showing in a qualitative manner that relationship between the degree of nucleation of the casting resin solution and the pore diameter of the resulting membrane.

The relationship between the degree of nucleation and the absolute particle removal rating of the resulting membrane is graphed in FIG. 1, which shows an inverse relationship between the pore diameter of the membrane sheet and the degree of nucleation, i.e., to obtain small pore diameter, a high degree of nucleation is required.

Reference to the graph of FIG. 1 shows that in Region A, where the degree of nucleation is very small, the pore size tends to become nonreproducible. In addition, the pressure drop at a given pore diameter is high. Membranes made on the assumption that the concentrations of the components are the controlling factors, and without nucleation, for example, by the process of Marinaccio, fall into this range, and tend to be of relatively poor quality. In Region B, the pore size decreases in a regular, though not necessarily linear fashion, as the degree of nucleation increases. In Region C, the casting resin solution becomes increasingly populated by particles of resin which have not redissolved, but still produces good quality membrane if these are removed by filtration prior to casting; and in Region D, the resin solution from which these lumps have been removed by filtration becomes unstable, and prone to early local or overall gelation before the film can be cast. The very high degree of nucleation in Region D is sometimes manifested by an opalescent appearance, suggesting that the nucleation procedure has resulted in an excessive number and/or excessively large nuclei.

Because methods of achieving a required intensity of mixing vary so greatly among the various types of equipment used in the mixing art, it is not possible to quantify this characteristic. Consequently, any given apparatus must initially be used on a "cut and try" basis to produce casting solutions of the desired characteristics, applying the principles tabulated in Table 1. Once the parameters of mixer rate, concentrations, temperatures, flow rates, etc. have been established, casting resin solutions having quite reproducible characteristics can be produced in the B and C Region of FIG. 1, on successive days or weeks of operation.

A favorable condition for producing membranes having low pressure drops and particle removal ratings covering a wide range utilizes a starting resin containing 20% of Grade BESNO Nylon 11 resin manufactured by Rilsan Corporation (or the equivalent), 79% of formic acid, and 1% of water. When this starting resin solution is diluted using the conditions of Examples 1 to 16, the results obtained in Tables IV through VIII are obtained. Membranes produced have absolute particle ratings ranging from about 0.15 micron to about 1 micron.

As previously described, three types of substrates are used:

(a) nonporous, for example, commercial polypropylene or other plastic film, glass, etc.;

(b) porous, not wetted by the casting resin solution; and (c) porous, wetted by the casting resin solution.

If the film is cast on a nonporous substrate of type (a), it is important that the substrate surface be wettable by the casting resin, and by the bath fluid. Glass, and similar surfaces, are naturally so wetted; however, synthetic plastic film materials, such as polyethylene, polypropylene, polyvinyl chloride, and polyester, are not, and if the casting solution is spread on such a substrate, according to the teachings of this invention, it will form a film with open pores on the face in contact with the bath, the pores being uniform throughout most of the body of the film, but with a dense skin on the substrate side. We have, however, discovered that if such plastic films are rendered more wettable, for example, by surface oxidative processes such as chromic acid treatment or corona discharge treatment, the resulting membrane is skinless on both faces, and of uniform pore size throughout. In such a membrane, it is difficult if not impossible to determine by any manner of appraisal which side was in contact with the substrate.

To obtain such skinless membrane sheets, a wide range of surfaces can serve as the substrate, provided that the critical surface tension is maintained at a sufficiently high value. This will vary somewhat depending on the concentration of formic acid in the resin solution and in the bath, the duration of the cooling interval and the temperature, and is best determined by trial-and-error treatment of the substrate surface for a given system. Critical surface tensions required are generally in the range from about 45 to about 60 dynes/cm, and most often in the range of from 50 to 56 dynes/cm.

As the cooling interval decreases, the membranes begin to form with increasingly heavier skins, and are characterized by high pressure drop, and poor pore size distribution characteristics.

The uniform pore membranes made by the process of this invention are characterized by liquid displacement curves such as shown in FIG. 3. When the membrane is immersed into a liquid whose surface tension is less than about 60 dynes/cm, its pores are filled by the liquid forming within the membrane a film of immobilized liquid, which remains in place when the membrane is removed from immersion. When air pressure is then applied across the membrane, there is noted a very small flow of air. This air flow when divided by the applied air pressure remains constant as the pressure is increased, when plotted as in FIG. 2. From the thickness of the film, and the known diffusion constant of air in the liquid, it can be calculated using Fick's law, that this flow is due to diffusion of air through the water film, and does not indicate flow through pores of the filter medium. At a sufficiently high pressure, the flow as plotted in FIG. 2 is seem to increase suddenly, reflecting displacement of liquid from the largest pores, and flow of air through these pores, and the curve becomes nearly vertical. The sharpness of this rise will be appreciated by noting that in this region, the membranes of this invention require less than a 1% to 3% increase in pressure drop to accomplish a 5000 fold increase in air flow rate.

The rapid transition from zero flow of air (except that due to diffusion) to a very steeply rising rate of flow for small changes in applied pressure, characterizes uniform pore media, which have sharply defined removal characteristics; such media will, for example, quantitatively remove one bacterium, but will allow an only slightly smaller organism to pass. Such membranes generally also have favorably low pressure drop, for a given removal.

Skinned membranes behave very differently; when wetted by a liquid and their air flow-pressure drop relationship is determined, the curve is not flat initially, but slopes upward, indicating presence of large pores; transition to a more nearly vertical line is slow, with a large radius, and in the "vertical" area, instead of the sharp rise of FIG. 2, a sloping line is obtained, reflecting a wide pore size range. Such membranes are poorly suited to obtain sterile filtrates when challenged by bacteria; either a nonsterile fluid is obtained, or if sterility is gotten, it is at the cost of very high pressure drop to achieve a low throughput rate.

It is apparent from the preceding discussion that when a bath is employed, control of the concentration of formic acid in the nonsolvent liquid in the bath is desirable to obtain a uniform product. In a continuous process, this control is obtained by an appropriate feed to the bath of nonsolvent liquid, while simultaneously withdrawing some of the bath liquid to maintain constant total bath volume. A relatively higher concentration of formic acid enters the bath from the casting resin solution, and the concentration of formic acid in the bath therefore tends to increase. Water is therefore constantly added to the bath to compensate. Accordingly, control of the rate of addition of water and of the rate of withdrawal of surplus bath solution will give the desired result: substantially constant concentration of formic acid in the solution, within the limits that give a membrane of the characteristics desired.

It is instructive to note that in the range of 0.2 $\mu$M and below, the uniformity from face to face of commercially available regenerated cellulose and cellulose ester membranes becomes quite poor, and such membranes are to some degree tapered pore types. In the same range, the membranes of the invention remain uniform, or may be tapered, as desired.

Thus, in the continuous production of membrane sheets in accordance with the invention, to obtain uniform characteristics in the membrane, the casting resin solution must be prepared under carefully controlled conditions and the bath liquid composition must remain constant. Such a liquid is referred to as an "equilibrium bath", i.e., a bath in which the concentration of ingredients remains constant, regardless of additions and withdrawals.

To illustrate, consider a casting resin solution containing 13.5% resin and 79.5% formic acid with the balance water, continuously being cast in film form on a substrate, air cooled for 30 seconds and then plunged into an aqueous nonsolvent bath containing 37.5% formic acid. As the resin membrane precipitates, a proportion of the solvent from the film of casting resin solution (which contains 79 parts of formic acid to 1 part of water, or 98.8% formic acid) diffuses into the bath, thereby altering its composition. To counteract this, water is continuously added to the bath at a rate controlled, for example, by a device using density measurements to report formic acid concentration, at the 37.5% level, and bath liquid is withdrawn continuously to maintain total bath volume constant. Maintaining this equilibrium bath makes it possible to continuously produce a membrane sheet having uniform pore characteristics.

When used continuously the bath temperature will gradually increase; cooling by a heat exchanger may be used to maintain constant conditions.

From the above-mentioned casting resin solution and bath, unsupported membrane sheets can be made by casting the resin solution onto an endless belt, or onto a plastic sheet unreeled from a roll, as a substrate to support the cast film.

The membrane sheet has a tendency to adhere to the substrate surface on drying, and it is therefore important to remove the membrane sheet from the surface while it is still wet, and before it has been dried and developed adherency.

Unsupported membrane sheets obtained by the process of the invention are quite strong, with water-wet tensile strengths in the range of 400 to 600 lbs/sq. inch, and elongations generally exceeding 40%.

For some applications, even higher tensile strengths may be desired. In addition, unsupported membrane sheet requires special care to manipulate in the typical range of thicknesses from 0.002 to 0.010 inch in which it is normally manufactured. In such cases, a supported membrane sheet is desired. Such membrane sheet is prepared by forming the film of resin solution on a substrate which adheres to the membrane sheet after it has been precipitated thereon. Either of the two types of substrates can be used; those which are not wetted by the resin solution, and those which are.

The unsupported filter membrane obtained at the conclusion of the membrane-forming process is wet with water, also contains a small amount of residual solvent, typically formic acid. This product can be dried in various ways.

It can, for example, be collected on a roll on a suitable core in lengths from 50 to 100 linear feet and placed in an oven until dry. During drying, some shrinkage occurs, but an acceptable product is obtained.

It is also possible to clamp a length of membrane in a frame holding all sides against shrinkage, and then dry the membrane by exposure to heat, as by infrared radiation, or in an oven in air. The resulting sheet is very flat, and when discs are cut from it, these are adapted for use in apparatus designed to accept disc filter membranes. The membrane discs are quite strong and flexible, and can be readily and reliably assembled in such apparatus.

A similar product can be obtained with less hand labor by passing the wetted membrane sheet over a hot drum, against which it is firmly held by a tensioned felt web or other porous sheet, and the dry web collected as a roll.

If two or more layers of wet unsupported membrane sheet are dried in contact with each other, using any of the drying methods described above, they adhere to each other, forming a multi-layer structure. No bonding agent or other adhesion technique is required.

The resulting multi-layer membranes are useful in the manner of a single layer filter membrane. Since in manufacture a small proportion of undetected faults may occur, caused, for example, by bubbles of air entrained in the casting resin solution, using two layers instead of one neutralizes such areas, covering them over with a second layer of filter membrane that is also capable of providing the required removal rating; an extremely high degree of reliability is obtained in this manner.

Very good adhesion of adjacent layers is also obtained if a layer of supported resin membrane and one not supported are dried in contact, using the same procedures. In this manner, filter media can be made in which a supported layer of uniform pore size is bonded to an unsupported tapered pore membrane layer, which provides efficient prefiltration. The fine face of the tapered pore layer would be about the same pore size or somewhat larger than the pore size of the supported layer, and this face would be adjacent to the unsupported layer.

Supported filter membranes in accordance with the invention are particularly well suited to use on filter presses, where self-sealing characteristics are needed, and the filters are subjected to large stresses. They are also useful in making plain or corrugated filter cartridges for use at high differential pressures, or for impulse type service.

The filter membranes of the invention are well suited for use as the filter media or as liquid/liquid separation media in cartridge form. Such cartridges are self-contained filter or separation elements, provided with a membrane sheet of the invention in tubular form, capped off by end caps at each end. Either or both end caps can have a through opening for fluid circulation through the filter sheet in either direction. Filter and separator cartridges are designed to be installed in and to be readily removable from assembly housings when replacement is necessary.

A good cartridge has a membrane sheet that is free of faults, and with removal characteristics that are relatively uniform with stated standards. Such cartridges take many forms, including simple cylinders, corrugated cylinders, stacked discs, etc.

Of these configurations, a favored form for the membrane sheet of the invention is a corrugated cylinder. Such a cylinder is made by corrugating one or more layers of supported or unsupported wet membrane (two layers is preferred) sandwiched between two open porous or foraminous sheets which provide for fluid flow up and downstream of the contacting surfaces of the membrane sheet within the corrugations. The resulting corrugated structure can be dried while lightly restrained, in the course of which contacting membrane layers are bonded together, thus forming a more rigid, stronger structure, and then seamed closed along the contacting ends, using heat-sealing techniques similar to those used for sealing conventional thermoplastic filter materials. End caps are then attached in a leak-tight manner to each end of the resulting cylinder. The preferred method is in accordance with U.S. Pat. No. 3,457,339, patented Dec. 8, 1965, to Pall et al. The end cap material can be any of a wide range of thermoplastic synthetic resin materials, particularly polypropylene, polyamides, polyesters and polyethylene. Polyester end caps, particularly polyethylene terephthalate and polybutylene terephthalate, seal very well to polyamide membrane materials.

In the manufacture of corrugated cylindrical cartridges, a seam must be made joining the ends of the corrugated structures. Since the polyamides used to make the membranes of this invention are thermoplastic, heat sealing may be used to close the seam, and is for many or most purposes an acceptable method. Heat sealing does have some disadvantages, however:

(a) in order to make the seal, it is, practically, necessary to bend the last leaf of each outermost corrugation to an angle of 90°, which is sometimes difficult to accomplish without weakening or other injury to the membrane sheet at the bend;

(b) the temperature used and duration of the sealing operation need to be changed to accommodate changes in thickness of the membrane sheet layers used; and (c) a weakening of the structure occurs due to the introduction of a stress concentration at the edge of the seal area; if highly stressed, the membrane will fail at this edge, in preference to any other part of the assembly.

All these disadvantages are overcome by a novel joining technique. We have discovered that a solution of trifluoroethanol containing 3 to 7% of Nylon 11 in solution can be applied to the outermost face of each end corrugation, and the two surfaces then lightly clamped together, and the fluoroethanol allowed to evaporate. Other solutions may be used, for example, of 33% solution of Nylon 11 in hot formic acid, similarly solutions of polyamide resins in hexafluoroisopropanol or hexafluoroacetone sesquihydrate. An excellent seal results, free of all the disadvantages enumerated above; indeed the seal area is now stronger than the remaining corrugations.

The quantity and concentration of the resin solution are quite noncritical, and good seals have been made with as little as zero percent or as much as 9% of Nylon 11 resin in the trifluoroethanol solution, but in this solvent solutions in the neighborhood of 5% are preferred, being stable, and having a convenient viscosity if a high molecular weight resin is used to prepare the solution. Solutions in hot formic acid have also been successfully used.

It is known in the industry to measure air flow rates through a membrane which has been wetted by a liquid; such measurements yield useful information on the pore size characteristics of the membrane. We have used, in the course of this invention, a parameter designated as $K_L$. $K_L$ is a form of abbreviation for the "knee location" of the curve of FIG. 3. When the air flow/unit of applied pressure through a wetted membrane is plotted against increasing applied pressure, as in FIG. 3, the initial air flow is very small and the flow per unit of applied pressure remains nearly constant, until a point is reached where a very small increment in pressure causes a very sharp rise in flow, such that the curve becomes nearly vertical. The pressure at which this occurs is designated as the $K_L$ for the membrane.

$K_L$ has been measured for a group of membranes made by the process of this invention from poly-11-amino-undecanamide (Nylon 11); these membranes were selected to cover a range of thickness from 0.003 inch to 0.012 inch, and with a wide range of pore diameters.

The horizontal portion of the curve of FIG. 2 is truly horizontal only if the pore size is quite uniform. Uniform pore media are further characterized by a sharp change in slope to a nearly vertical course at the $K_L$ value. If the filter medium is relatively nonuniform in pore size, it will tend to have a distinct slope in the horizontal portion of the curve, and exhibits a relatively large radius for the change in slope to the more vertical portion of the curve, followed by a sloping rather than a nearly vertical portion.

The lower or horizontal portion of the curve is a measure of the diffusion of air through the immobilized, liquid film which fills the pores of the membrane. The wetting liquid may possess a surface tension ($\gamma$) as high as 60 dynes/cm (e.g. formamide, $\gamma=58.2$), in which case a relatively low air flow is obtained in the horizontal part of the curve; if the surface tension is lower (e.g. ethanol, $\gamma=24.05$), then the diffusional air flow is higher. At the change in slope, the wetting liquid begins to be expelled from the pores, and in the vertical portion of the curve, a large number of nearly equal size pores begin to pass air.

When the data of FIG. 2 are plotted for a tapered pore membrane, that is, one with larger pores at one face tapering to a smaller pore at the other face of the membrane, the curves obtained by reversing the direction of pressurization do not coincide. Instead, two distinct curves are obtained, one flat, and the other higher and sloping upward, of which the sloping curve with higher flow values is obtained when the more open side is upstream, and reflects the penetration of air partly into the coarser face of the membrane, thereby effectively decreasing the thickness of the liquid film, and hence increasing the air diffusion rate.

Thus, by applying air pressure and measuring flow through a membrane successively in both directions, it is possible to determine whether it is a uniform or tapered pore membrane. If the flow-pressure curves are equal, or nearly so, in both directions, the pores are uniform.

The following Examples in the opinion of the inventor represent preferred embodiments of the invention:

EXAMPLES 1 to 3

Nylon 11 resin pellets (Grade BESNO, Rilsan Corporation, Glen Rock, N.J.) were dissolved in 98.5% formic acid to yield a 70% solution containing 20% resin. Without delay, a controlled flow of nonsolvent solution, comprised of a mixture of formic acid and water at the same temperature was delivered to the mixing vessel and combined with the resin solution through an inlet nozzle 2 mm in inside diameter and located ¼ inch from the arc described by the propeller of a two-inch diameter propeller-type agitator which served as the mixer. With the agitator rotating at 250 to 500 RPM, a specified amount of nonsolvent solution was pumped into the vessel at a constant rate. Toward the end of the nonsolvent addition period, resin was seen to precipitate at the inlet nozzle, all of which subsequently redissolved except for a small quantity of lumps of resin about ⅛ inch in diameter.

About 20 grams of this casting resin solution so formed was withdrawn through a valve in the bottom of the mixing vessel, passed through a 42 mesh screen to remove lumps, and without delay spread on a glass plate as a thin film, using a 0.010 inch doctor blade. The film was allowed to air-cool, whereupon the Nylon 11, resin began to precipitate as evidenced by the development of a cloudy cast to the film. The film was then promptly immersed in a bath containing formic acid and water at 25° C.

The membranes were allowed to set for several minutes, stripped from the glass plate, washed in water, and dried by exposure to infrared heat while restrained to prevent shrinkage. The resulting membrane could not be wetted by water. When a drop of water was placed on the surface of a membrane, it remained on the surface, retaining its hemispherical form, and exhibited a contact angle of 80°-105°. On the other hand, the membranes could be wetted readily by liquids with surface tension below about 60 dynes/cm; for example, a droplet of formamide (surface tension, 58 dynes/cm) quickly penetrated the membrane surface and permeated the porous infrastructure.

The properties of the membranes prepared as described above are shown in Table II. The principal process variable whose value was altered during these runs was the duration of the cooling interval. Example A is a control included to illustrate the effect of employing a cooling interval of less than 5 seconds.

TABLE II

| Example No. | Pump Speed RPM | Mixer Speed RPM | Casting Resin Solution[1] | | | Cooling Interval Prior to Immersion in bath (seconds) | % Formic Acid in bath | $K_L$[3] psi | $\Delta p$[4] (in. Hg) | Remarks |
|---|---|---|---|---|---|---|---|---|---|---|
| | | | Temp (°C.) | % Resin | % Formic Acid | | | | | |
| A | 500 | 300 | 67 | 13.5 | 79 | <5 | 35 | 1 | 47.9 | Skinned |
| 1 | 500 | 300 | 67 | 13.5 | 79 | 15 | 35 | 7.3 | 12.1 | Lightly skinned |
| 2 | 500 | 300 | 67 | 13.5 | 79 | 30 | 35 | 3.1 | 4.1 | Unskinned |
| 3 | 500 | 300 | 67 | 13.5 | 79 | 45 | 35 | 8.2 | 4.0 | Unskinned |

[1]Nonsolvent is water in all cases
[2]Balance of bath is water
[3]Measured in 95% ethanol γ = 25 dynes/cm
[4]pressure drop in inches of mercury column at an air flow rate of 28 cubic feet per minute

EXAMPLES 4 to 6

Nylon 11 resin pellets (Grade BESNO, Rilsan Corporation, Glen Rock, N.J.) were dissolved in 98.5% formic acid to yield a 70% solution containing 24% resin. Without delay a controlled flow of nonsolvent solution, composed of a mixture of formic acid and water at the same temperature, was delivered to the mixing vessel and combined with the resin solution through an inlet nozzle 2 mm in inside diameter and located ¼ inch from the arc described by the propeller of a two-inch diameter propeller-type agitator which served as the mixer. With the agitator rotating at 250 to 500 RPM, a specified amount of nonsolvent solution was pumped into the vessel at a constant rate. Toward the end of the nonsolvent addition period, resin was seen to precipitate at the inlet nozzle, all of which subsequently redissolved except for a small quantity of lumps of resin about ⅛ inch in diameter.

About 20 grams of this casting resin solution so formed was withdrawn through a valve in the bottom of the mixing vessel, passed through a 42 mesh screen to remove lumps, and without delay spread on a glass plate as a thin film, using a 0.010 inch doctor blade. The film was allowed to air-cool, whereupon the Nylon 11 resin began to precipitate, as evidenced by the development of a cloudy cast to the film. The film was then promptly immersed in a bath containing formic acid and water at 25° C.

The membrane was allowed to set for several minutes, stripped from the glass plate, washed in water, and dried by exposure to infrared heat while restrained to prevent shrinkage.

The resulting membrane could not be wetted by water. When a drop of water was placed on the surface of a mambrane, it remained on the surface, retaining its hemispherical form, and exhibited a contact angle of 80°-105°. On the other hand, the membrane could be wetted readily by liquids with surface tension below about 60 dynes/cm; for example, a droplet of formamide (surface tension, 58 dynes/cm) quickly penetrated the membrane surface and permeated the porous infra-structure.

The properties of the membranes prepared as described above are shown in Table III. The principal process variable whose value was altered during these runs was the duration of the cooling interval. Examples B and C are controls illustrating the effect of a cooling interval of 8 or less seconds.

Example 6 illustrates that, if the cooling interval is sufficiently long, a skinless membrane can be produced even when solvent is omitted from the bath; however, comparison of Examples 5 and 6 illustrates that control of solvent to nonsolvent ratio in the bath is critical in controlling pore size of the membrane produced.

TABLE III

| Example No. | Pump Speed RPM | Mixer Speed RPM | Casting Resin Solution[1] | | | Cooling Interval Prior to Immersion in bath (seconds) | % Formic Acid in bath[2] | $K_L$[3] psi | $\Delta p$[4] (in.Hg) | Remarks |
|---|---|---|---|---|---|---|---|---|---|---|
| | | | Temp °C. | % Resin | % Formic Acid | | | | | |
| B | 500 | 300 | 67 | 17 | 76.2 | <5 | 30 | NA | >60 | Skinned |
| C | 500 | 300 | 67 | 17 | 76.2 | 8 | 30 | 3.8 | >60 | Skinned |
| 4 | 500 | 300 | 67 | 17 | 76.2 | 15 | 35 | 3.8 | 16.7 | Moderately Skinned |
| 5 | 500 | 300 | 67 | 17 | 76.2 | 45 | 35 | 15.1 | 5.7 | Unskinned |
| 6 | 500 | 300 | 67 | 17 | 76.2 | 45 | 0 | 3.6 | 3.3 | Unskinned |

[1]Nonsolvent is water in all cases
[2]Balance of bath is water
[3]Measured in 95% ethanol: γ = 25 dynes/cm
[4]pressure drop in inches of mercury column at an air flow rate of 28 cubic feet per minute

EXAMPLES 7 TO 10

Nylon 11 resin pellets (Grade BESNO, Rilsan Corporation, Glen Rock, N.J.) were dissolved in 98.5% formic acid to yield a 70% solution containing 20% resin. Without delay, a controlled flow of nonsolvent solution, composition of a mixture of formic acid and water at the same temperature, was delivered to the mixing vessel and combined with the resin solution through an inlet nozzle 2 mm in inside diameter and located ¼ inch from the arc described by the propeller of a two-inch diameter propeller-type agitator which served as the mixer. With the agitator rotating at 250 to 500 RPM, a specified amount of nonsolvent solution was pumped into the vessel at a constant rate. Toward the end of the nonsolvent addition period, resin was seen to precipitate at the inlet nozzle, all of which subsequently redissolved except for a small quantity of lumps of resin about ⅛ inch in diameter.

About 20 grams of this casting resin solution so formed was withdrawn through a valve in the bottom of the mixing vessel, passed through a 42 mesh screen to remove lumps, and without delay spread on a glass plate as a thin film, using a 0.010 inch doctor blade. The film was allowed to air-cool, whereupon the Nylon 11 resin began to precipitate, as evidenced by the development of a cloudy cast to the film. The film was then promptly immersed in a bath containing formic acid and water at 25° C.

The membrane was allowed to set for several minutes, stripped from the glass plate, washed in water, and dried by exposure to infrared heat while restrained to prevent shrinkage.

The resulting membrane couuld not be wetted by water. When a drop of water was placed on the surface of a membrane, it remained on the surface, retaining its hemispherical form, and exhibited a contact angle of 80°-105°. On the other hand, the membrane could be wetted readily by liquids with surface tension below about 60 dynes/cm; for example, a droplet of formamide (surface tension, 58 dynes/cm) quickly penetrated the membrane surface and permeated the porous infra-structure.

The properties of the membranes prepared as described above are shown in Table IV. All were skinless membranes with pore sizes ranging from about 0.15 to 0.35 micrometer.

began to precipitate, as evidenced by the development of a cloudy cast to the film. The film was then promptly immersed in a bath containing formic acid and water at 25° C.

The membrane was allowed to set for several minutes, stripped from the glass plate, washed in water, and dried by exposure to infrared heat while restrained to prevent shrinkage.

The resulting membrane could not be wetted by water. When a drop of water was placed on the surface of a membrane, it remained on the surface, retaining its hemispherical form, and exhibited a contact angle of 80°-105°. On the other hand, the membrane could be wetted readily by liquids with surface tension below about 60 dynes/cm; for example, a droplet of formamide (surface tension, 58 dynes/cm) quickly penetrated the membrane surface and permeated the porous infra-structure.

The properties of the membranes prepared as described above are shown in Table V. Under the conditions shown, skinless membranes with pore sizes in the 0.3 to 1.0 micrometer range were produced, as indicated by the $K_L$ values shown in Table V.

TABLE IV

| Example No. | Pump Speed RPM | Mixer Speed RPM | Casting Resin Solution[1] | | | Cooling Interval prior to Immersion in bath (seconds) | % Formic Acid in bath[2] | $K_L$[3] psi | $\Delta p$[4] (in. Hg) | Remarks |
| --- | --- | --- | --- | --- | --- | --- | --- | --- | --- | --- |
| | | | Temp °C. | % Resin | % Formic Acid | | | | | |
| 7 | 500 | 300 | 67 | 13.5 | 79 | 30 | 37.5 | 9.4 | 4.6 | Skinless |
| 8 | 500 | 300 | 67 | 13.5 | 79 | 45 | 37.5 | 16.4 | 8.9 | Skinless |
| 9 | 500 | 300 | 67 | 13.5 | 79 | 35 | 37.5 | 15.4 | 4.9 | Skinless |
| 10 | 500 | 300 | 67 | 13.5 | 79 | 30 | 25 | 20 | 5.9 | Skinless |

[1]Nonsolvent is water in all cases
[2]Balance of bath is water
[3]Measured in 95% ethanol: $\gamma = 25$ dynes/cm
[4]Pressure drop in inches of mercury column at an air flow rate of 28 cubic feet per minute

EXAMPLES 11 TO 13

Nylon 11 resin pellets (Grade KESNOA) Rilsan Corporation, Glen Rock, N.J.) were dissolved in 98.5% formic acid to yield a 70% solution containing 20% resin. Without delay, a controlled flow of nonsolvent solution, composed of a mixture of formic acid and water at the same temperature was delivered to the mixing vessel and combined with the resin solution through an inlet nozzle 2 mm in inside diameter and located ¼ inch from the arc described by the propeller of a two-inch diameter propeller-type agitator which served as the mixer. With the agitator rotating at 250 to 500 RPM, a specified amount of nonsolvent solution was pumped into the vessel at a constant rate. Toward the end of the nonsolvent addition period, resin was seen to precipitate at the inlet nozzle, all of which subsequently redissolved, except for a small quantity of lumps of resin about ⅛ inch in diameter.

About 20 grams of this casting resin solution so formed was withdrawn through a valve in the bottom of the mixing vessel, passed through a 42 mesh screen to remove lumps, and without delay spread on a glass plate as a thin film, using a 0.010 inch doctor blade. The film was allowed to air-cool, whereupon the Nylon 11 resin

TABLE V

| Example No. | Pump Speed RPM | Mixer Speed RPM | Casting Resin Solution[1] | | | Cooling Interval Prior to Immersion in bath (seconds) | % Formic Acid in bath[2] | $K_L$[3] psi | $\Delta p$[4] (in. Hg) | Thickness mm | Remarks |
| --- | --- | --- | --- | --- | --- | --- | --- | --- | --- | --- | --- |
| | | | Temp. °C. | % Resin | % Formic Acid | | | | | | |
| 11 | 500 | 500 | 70 | 13.5 | 80 | 30 | 37.5 | 4 | 6 | 10 | Unskinned |
| 12 | 500 | 250 | 70 | 13.5 | 80 | 10 | 37.5 | 12 | 1 | 4.5 | Unskinned |
| 13 | 500 | 250 | 70 | 13.5 | 80 | 20 | 37.5 | 3.5 | 1.5 | 4 | Unskinned |

[1]Nonsolvent is water in all cases
[2]Balance of bath is water
[3]Measured in 95% ethanol: $\gamma = 25$ dynes/cm
[4]Pressure drop in inches of mercury column at an air flow rate of 28 cubic feet per minute

EXAMPLE 14

Nylon 612 pellets (Zytel 158, E. I. du Pont de Nemours, Wilmington, Del.) were dissolved in 98.5% formic acid to yield a 70% solution containing 24% resin. Without delay a controlled flow of nonsolvent solution, composed of a mixture of formic acid and water at the same temperature, was delivered to the mixing vessel and combined with the resin solution through an inlet nozzle 2 mm in inside diameter and located ¼ inch from the arc described by the propeller of a two-inch diameter propeller-type agitator which served as the mixer. With the agitator rotating at 250 to 500 RPM, a specified amount of nonsolvent solution was pumped into the vessel at a constant rate. Toward the end of the nonsolvent addition period, resin was seen to precipitate at the inlet nozzle, all of which subsequently redissolved except for a small quantity of lumps of resin about ⅛ inch in diameter.

About 20 grams of this casting resin solution so formed was withdrawn through a valve in the bottom of the mixing vessel, passed through a 42 mesh screen to remove lumps, and without delay spread on a glass plate as a thin film, using a 0.010 inch doctor blade. The film was allowed to air-cool, whereupon the Nylon 612 resin began to precipitate, as evidenced by the development of a cloudy cast to the film. The film was then promptly immersed in a bath containing formic acid and water at 25° C.

The member was allowed to set for several minutes, stripped from the glass plate, washed in water, and dried by exposure to infrared heat while restrained to prevent shrinkage.

The resulting membrane could not be wetted by water. When a drop of water was placed on the surface of a membrane, it remained on the surface, retaining its hemispherical form, and exhibited a contact angle of 80°–105°. On the other hand, the membrane could be wetted readily by liquids with surface tension below about 60 dynes/cm; for example, a droplet of formamide (surface tension, 58 dynes/cm) quickly penetrated the membrane surface and permeated the porous infra-structure.

The properties of the membranes prepared as described above as shown in Table VI. The principal process variable whose value was altered during these runs was the duration of the cooling interval. Example D is a control illustrating the effect of a cooling interval of less than 5 seconds.

Example 14 illustrates that, if the cooling interval is sufficiently long, a skinless membrane can be produced.

TABLE VI

| Example No. | Pump Speed RPM | Mixer Speed RPM | Casting Resin Solution[1] | | | Cooling Interval Prior to Immersion in bath (seconds) | % Formic Acid in bath[2] | $K_L$[3] psi | $\Delta p$[4] (in. Hg) | Remarks |
|---|---|---|---|---|---|---|---|---|---|---|
| | | | Temp °C. | % Resin | % Formic Acid | | | | | |
| D | 500 | 300 | 67 | 17 | 71 | 4.5 | 30 | NA | >60 | Skinned |
| 14 | 500 | 300 | 67 | 17 | 71 | 8.5 | 30 | 26 | 7.3 | Unskinned |

[1]Nonsolvent is water in all cases
[2]Balance of bath is water
[3]Measured in 95% ethanol: γ = 25 dynes/cm
[4]Pressure drop in inches of mercury column at an air flow rate of 28 cubic feet per minute Having regard to the foregoing disclosure the following is claimed as inventive and patentable embodiments thereof:

1. A process for preparing skinless liquophilic alcohol insoluble polyamide membranes which comprises preparing at a first dissolution temperature a solution in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate and degree of agitation to obtain a visible precipitate of polyamide resin particles, thereby forming a casting solution; spreading the casting solution on a substrate to form a thin film thereof on the substrate; cooling the film of casting solution to a second gelation temperature sufficiently lower than the first temperature to precipitate polyamide resin from the casting solution; contacting and diluting the film of casting solution with a nonsolvent liquid to precipitate polyamide resin from the casting solution in the form of a thin skinless liquophilic membrane; and washing and drying the resulting membrane.

2. A process according to claim 1 in which precipitated polyamide resin particles are redissolved before spreading the casting solution on a substrate.

3. A process according to claim 1 in which precipitated polyamide resin particles are filtered out before spreading the casting solution on a substrate.

4. A process according to claim 1 in which part of the precipitated polyamide resin particles are redissolved and part are filtered out before spreading the casting solution on a substrate.

5. A process according to claim 1 in which the nonsolvent used to contact and dilute the casting solution is a mixture of solvent and nonsolvent liquids containing a substantial proportion of the solvent liquid, but less than the proportion in the casting solution.

6. A process according to claim 1 in which the polyamide resin is polyhexamethylene dodecandiamide.

7. A process according to claim 1 in which the polyamide resin is poly-11-amino-undecanamide.

8. A process according to claim 1 in which the polyamide resin is polyhexamethylene dodecandiamide, the solvent for the polyamide resin solution is formic acid, and the nonsolvent added for dilution is water.

9. A process according to claim 1 in which the polyamide resin is polyundecanamide, the solvent for the polyamide resin solution is formic acid, and the nonsolvent added for dilution is water.

10. A process according to claim 1 in which the first dissolution temperature is within the range from about 50° to about 200° C. and the second gelation temperature is within the range from about 10° to about 35° C.

11. A process according to claim 10 in which the polyamide resin solution film is air-cooled for at least ten seconds and is then contacted with the nonsolvent by immersing the film carried on the substrate in a bath of nonsolvent liquid.

12. A process according to claim 11 in which the bath comprises both solvent and nonsolvent liquids.

13. A process according to claim 12 in which the bath comprises an amount within the range from about 0.1 to about 50% of a solvent for the resin; washing the resulting membrane substantially free of solvent; and drying the membrane.

14. A process according to claim 11 in which precipitation is substantially carried to completion during the air-cooling step.

15. A process according to claim 10 in which the membrane is air-dried.

16. A process according to claim 10 in which the membrane is washed directly following precipitation.

17. A process according to claim 1 in which the polyamide resin is polyhexamethylene dodecandiamide, the solvent is formic acid, and the nonsolvent is water, and the polyamide resin concentration in the casting solution is within the range from about 10 to about 20% by weight, and the formic acid concentration is within the range from about 70 to about 85%.

18. A process according to claim 17 in which the polyamide resin concentration of the casting solution is within the range from about 10 to about 20%, and the nonsolvent is added at a fixed intensity of mixing.

19. A process according to claim 10 in which the casting resin is continuously spread onto the substrate, the thin film of casting solution is continuously air-cooled through a gap which assures a minimum cooling time of seconds, and then immersed in a bath of nonsolvent liquid, and the bath is maintained at a substantially constant composition with respect to nonsolvent and solvent by continuous addition of nonsolvent to the bath in a quantity to compensate for solvent diffusion into the bath from the thin film of casting solution.

20. A process according to claim 19 in which the substrate is a nonporous synthetic polymer film having a surface that is wetted by the casting solution and the bath.

21. A process according to claim 19 in which the substrate is a porous web having an open structure which is wetted and impregnated by the casting solution, thereby forming a membrane film having the porous web incorporated as a part thereof.

22. A process according to claim 19 in which the substrate is a fibrous polyester sheet.

23. A process according to claim 19 in which the substrate is a porous web which is not wetted by the casting solution, thereby forming a membrane film having the porous web attached to one surface thereof.

24. A process according to claim 10 in which the casting and gelation temperatures are within the range from about 10° C. to the boiling temperature of the lowest boiling solvent or nonsolvent component present.

25. A process according to claim 1 in which the polyamide resin solution has a viscosity within the range from about 5,000 centipoises to about 50,000 centipoises at the operating temperature.

26. A process according to claim 1 in which the casting resin solution is clear, and free from suspended material, before being spread upon the substrate to form a film.

27. A process according to claim 1 in which the membrane is stripped from the substrate after washing and before drying.

28. A process according to claim 1 in which the substrate is not stripped from the polyamide resin membrane before drying, and after drying remains attached to the polyamide resin membrane.

29. A process according to claim 1 in which the substrate is of polypropylene resin.

30. A process according to claim 1 in which the substrate is of polyester resin.

31. A process according to claim 1 in which the solvent for the polyamide resin solution is formic acid maintained at a first dissolution temperature of at least 50° C. and the nonsolvent is water, and the polyamide resin solution film is allowed to cool in air for at least 10 seconds followed by contact with the nonsolvent by immersing the film carried on the substrate in a bath of nonsolvent comprising water containing a substantial proportion of formic acid.

32. A process for preparing skinless liquophilic alcohol-insoluble poly-11-amino-undecanamide resin membranes having pores that are substantially uniform from surface to surface which comprises preparing a flowable solution of the alcohol-insoluble liquophobic polyundecanamide resin in a concentration within the range from about 10 to about 20 by weight at a first dissolution temperature of at least 50° C. in a solution in aqueous formic acid containing from about 70 to about 85% formic acid; inducing nucleation of the solution by addition of water to the solution under controlled conditions of concentration, temperature, addition rate, and degree of agitation to obtain a visible precipitate of polyamide resin particles, thereby forming a casting solution; removing any undissolved resin by filtration; spreading the casting solution on a substrate to form a thin film thereof on the substrate; cooling the film of casting solution to a second gelation temperature sufficiently lower than the first temperature to precipitate polyamide resin from the casting solution; contacting and diluting the film of casting solution with either water or an aqueous solution of formic acid containing up to 50% formic acid by weight, to precipitate polyamide resin from the casting solution in the form of a thin skinless liquophilic membrane; washing the membrane to remove solvent; and drying the membrane.

33. A process according to claim 32 in which the membrane is stripped from the substrate after washing and before drying.

34. A process according to claim 32 in which precipitated polyamide resin particles are dissolved before spreading the casting solution on a substrate.

35. A process according to claim 32 in which precipitated polyamide resin particles are filtered out before spreading the casting solution on a substrate.

36. A process according to claim 32 in which part of the precipitated polyamide resin particles are redissolved and part are filtered out before spreading the casting solution on a substrate.

37. A continuous process for preparing skinless liquophilic alcohol-insoluble polyamide membranes which comprises preparing at a first dissolution temperature a solution in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solution of a nonsolvent for the polyamide resin, under controlled conditions of concentration, temperature, addition rate, and degree of agitation to obtain a visible precipitate of polyamide resin particles thereby forming a casting solution; removing any undissolved resin by filtration; spreading the casting solution on a substrate which is nonporous and whose surface is wetted by the casting solution to form a thin film thereof on the substrate; cooling the film of casting solution to a second gelation temperature sufficiently lower than the first temperature to precipitate polyamide resin from the casting solution; contacting and diluting the film of casting solution with a nonsolvent liquid to precipitate polyamide resin from the casting solution in the form of a thin skinless liquophilic membrane; and continuously washing and drying the resulting membrane, while maintaining constant the relative proportion of solvent and nonsolvent liquid in the bath.

38. A process according to claim 37, in which the rates of withdrawal and addition of solvent and nonsolvent to and from the bath are maintained substantially constant.

39. A process according to claim 37, in which the polyamide is poly-11-amino-undecanamide or polyhexamethylene dodecandiamide.

40. A liquophilic skinless alcohol-insoluble polyamide resin membrane sheet of alcohol-insoluble liquophobic polyamide resin, capable when completely immersed in an organic liquid having a surface tension of from about 40 to about 60 dynes/cm of being wetted through within no more than one second, and reverting when heated to a temperature just below the softening temperature of the membrane to a liquophobic material which is no longer wetted by such organic liquids.

41. A liquophilic skinless alcohol-insoluble polyamide resin membrane sheet according to claim 40 having through pores extending from surface to surface that are substantially uniform in shape and size.

42. A liquophilic skinless alcohol-insoluble polyamide resin membrane sheet according to claim 40 having through pores extending from surface to surface that are tapered, wider at one surface and narrowing towards the other surface of the membrane sheet.

43. A liquophilic skinless alcohol-insoluble polyamide resin membrane sheet according to claim 40 having absolute particle removal ratings of 0.10 $\mu$M to 5 $\mu$M.

44. A liquophilic skinless alcohol-insoluble polyamide resin membrane sheet according to claim 40 in which the polyamide resin is poly-11-amino-undecanamide.

45. A liquophilic skinless alcohol-insoluble polyamide resin membrane sheet according to claim 40 in which the polyamide resin is polyhexamethylene dodecandiamide.

46. A liquophilic skinless alcohol-insoluble polyamide resin membrane sheet according to claim 40 having two membrane layers adherent to each other and forming a single membrane sheet with particle removal characteristics superior to those of the individual membrane layers.

47. A liquophilic skinless alcohol-insoluble polyamide resin membrane sheet according to claim 46 in which the two membrane layers have the same porosities.

48. A liquophilic skinless alcohol-insoluble polyamide resin membrane sheet according to claim 46 in which the two membrane layers having differing porosities.

49. A liquophilic skinless alcohol-insoluble polyamide resin membrane sheet according to claim 46 in which the membranes have tapered pores.

50. A liquophilic skinless alcohol-insoluble polyamide resin membrane sheet according to claim 46 in which the membranes have uniform pores.

51. A liquophilic skinless alcohol-insoluble polyamide resin membrane sheet according to claim 46 in which the membranes are supported.

52. A liquophilic skinless alcohol-insoluble polyamide resin membrane sheet according to claim 46 in which the membranes are unsupported.

53. A liquophilic skinless alcohol-insoluble polyamide resin membrane sheet according to claim 40 having a thickness within the range from about 0.025 to about 0.8 mm.

54. A filter and separator element comprising a liquophilic skinless alcohol-insoluble polyamide resin membrane sheet according to claim 40 formed in a tubular configuration with the ends of the tube sealed to end caps of which at least one end cap has a central aperture giving access to the interior of the tube, and with the sides of the sheet lapped and sealed together, all seals being fluid-tight.

55. A filter and separator element according to claim 54 in which the sheet is corrugated.

56. A filter and separator element according to claim 54 in which at least one of the exterior faces of the sheet is adhered to a porous support layer.

57. A filter and separator element according to claim 56 in which both the membrane sheet and the support layer are corrugated.

58. A filter and separator element according to claim 54 comprising a multilayer membrane sheet, the layers being adhered together as one sheet.

59. A filter and separator element according to claim 58 in which the layers of membrane are separated by a porous support layer to which each membrane layer is adhered.

60. A filter and separator element according to claim 46 in which the end caps are of polyester resin and the filter element including the end caps is liquophilic and rapidly wetted by liquids with surface tension below about 60 dynes/cm.

61. A filter and separator element according to claim 52 in which the polyester is polybutylene terephthalate.

62. A filter and separator element according to claim 52 in which the polyester is polyethylene terephthalate.

63. A process for preparing skinless liquophilic alcohol-insoluble polyamide membrane sheets having multimembrane layers, which comprises preparing at a first dissolution temperature at least two starting solutions in a polyamide solvent having a temperature coefficient of solubility within the range from about 0.01 to about 5 weight percent per degree Centigrade of an alcohol-insoluble polyamide resin having a ratio $CH_2$:NHCO of methylene $CH_2$ to amide NHCO groups within the range from about 7:1 to about 12:1; inducing nucleation of the solution by controlled addition to the solutions of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; removing any undissolved resin by filtration; spreading the casting solutions on a substrate to form thin films thereof on the substrate; cooling the films of casting solution to a second gelation temperature sufficiently lower than the first temperature to precipitate polyamide resin from the casting solution; contacting and diluting the films of casting solution with a nonsolvent liquid to precipitate polyamide resin from the casting solution in the form of a thin skinless liquophilic membrane; washing the resulting two membranes; combining the two membranes so formed as a dual layer; and drying the dual layer under conditions of restraint to prevent more than minor reduction of the length and width of the membrane; the membranes so dried forming a single sheet with particle removal characteristics superior to those of the individual layers.

64. A process according to claim 63 in which the separate membranes are stripped from the substrate before drying.

65. A process according to claim 63 in which the separate membranes are dried while supported on the substrate, which thereby becomes an integral part of the multilayer membrane.

66. A process according to claim 65 in which the substrate is a porous fibrous web.

67. A process according to claim 66 in which the fibrous web is of polyester resin.

68. A process according to claim 66 in which the fibrous web is of polypropylene resin.

69. A process according to claim 64 in which the polyamide resin is polyhexamethylene dodecandiamide.

70. A process according to claim 64 in which the polyamide resin is poly-11-amino-undecanamide.

71. A process according to claim 64 in which the membranes are dried under restraint to limit dimensional change.

72. A process according to claim 64 in which the membranes are corrugated and then dried.

73. A multilayer liquophilic skinless alcohol-insoluble polyamide resin membrane sheet of alcohol-insoluble hydrophobic polyamide resin, capable when completely immersed in an organic liquid having a surface tension of from about 40 to about 60 dynes/cm of being wetted through within no more than one second, and reverting when heated to a temperature just below the softening temperature of the membrane to a liquophobic material which is no longer wetted by such organic liquids, and having at least two membrane layers integrally adhered together.

74. A multilayer liquophilic skinless alcohol-insoluble polyamide resin membrane sheet according to claim 73 in which the membrane layers are supported on a substrate.

75. A multilayer liquophilic skinless alcohol-insoluble polyamide resin membrane sheet according to claim 74 in which the substrate is a porous fibrous web.

76. A multilayer liquophilic skinless alcohol-insoluble polyamide resin membrane sheet according to claim 74 in which the fibrous web is of polyester resin.

77. A multilayer liquophilic skinless alcohol-insoluble polyamide resin membrane sheet according to claim 75 in which the fibrous web is of polypropylene resin.

78. A multilayer liquophilic skinless alcohol-insoluble polyamide resin membrane sheet according to claim 73 in which the polyamide resin is polyhexamethylene dodecandiamide.

79. A multilayer liquophilic skinless alcohol-insoluble polyamide resin membrane sheet according to claim 73 in which the polyamide resin is poly-11-amino-undecanamide.

* * * * *